United States Patent
Kezobo et al.

(10) Patent No.: US 7,459,879 B2
(45) Date of Patent: Dec. 2, 2008

(54) MOTOR CONTROLLER

(75) Inventors: Isao Kezobo, Tokyo (JP); Masahiro Kimata, Tokyo (JP); Kazumichi Tsutsumi, Tokyo (JP); Chiaki Fujimoto, Tokyo (JP); Kouji Fukusumi, Tokyo (JP); Noriyuki Inoue, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 118 days.

(21) Appl. No.: 10/590,931

(22) PCT Filed: Mar. 16, 2005

(86) PCT No.: PCT/JP2005/004667

§ 371 (c)(1),
(2), (4) Date: Aug. 28, 2006

(87) PCT Pub. No.: WO2005/091488

PCT Pub. Date: Sep. 29, 2005

(65) Prior Publication Data

US 2007/0176577 A1    Aug. 2, 2007

(30) Foreign Application Priority Data

Mar. 19, 2004   (JP) .......................... 2004-080513

(51) Int. Cl.
*H02P 27/04* (2006.01)
(52) U.S. Cl. .................. 318/803; 318/727; 318/811
(58) Field of Classification Search .............. 318/803, 318/727, 811, 809, 808, 801, 800, 782, 432, 318/433
See application file for complete search history.

(56) References Cited

U.S. PATENT DOCUMENTS

2006/0113954 A1* 6/2006 Ma et al. ..................... 318/803

FOREIGN PATENT DOCUMENTS

| CN | 1404215 A    | 3/2003  |
|----|--------------|---------|
| JP | 10 181617    | 7/1998  |
| JP | 2001 136781  | 5/2001  |
| JP | 2001 157487  | 6/2001  |
| JP | 2002 027779  | 1/2002  |
| JP | 2002 095291  | 3/2002  |
| JP | 2003 026020  | 1/2003  |
| JP | 2003 174790  | 6/2003  |
| JP | 2003 348898  | 12/2003 |

* cited by examiner

*Primary Examiner*—Karen Masih
(74) *Attorney, Agent, or Firm*—Oblon, Spivak, McClelland, Maier & Neustadt, P.C.

(57) ABSTRACT

A control apparatus for an electric motor, in which a current controller giving multiphase voltage commands to a drive circuit for an inverter includes a normal-mode current controller for use in a normal mode, an abnormal-mode current controller for use in an abnormal mode, and an abnormality decision device. In a case of an abnormality occurring to one phase of an electric motor or the inverter, the controller is altered, and the abnormal-mode multiphase voltage commands which are generated by the abnormal-mode current controller are set as the multiphase voltage commands for the inverter drive circuit.

14 Claims, 20 Drawing Sheets

FIG. 6
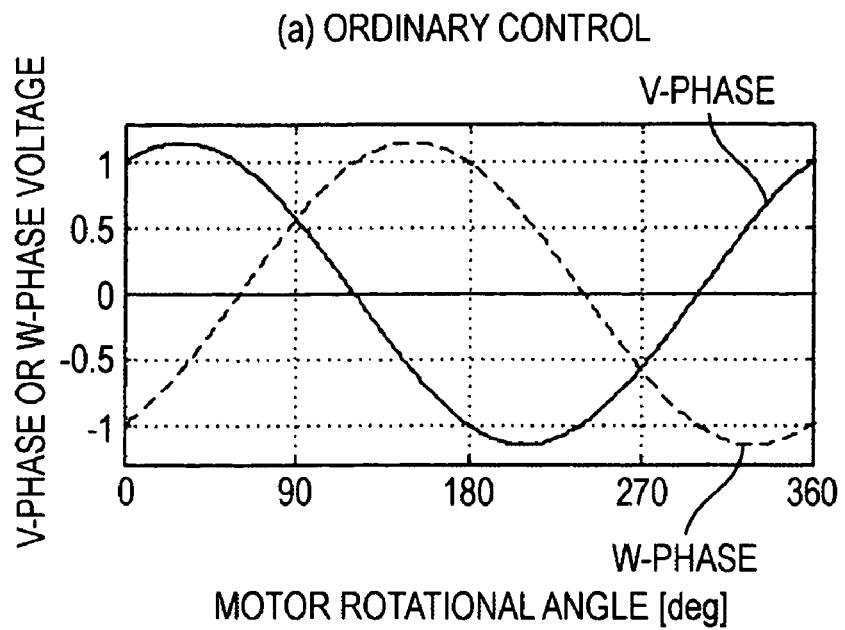
(a) ORDINARY CONTROL
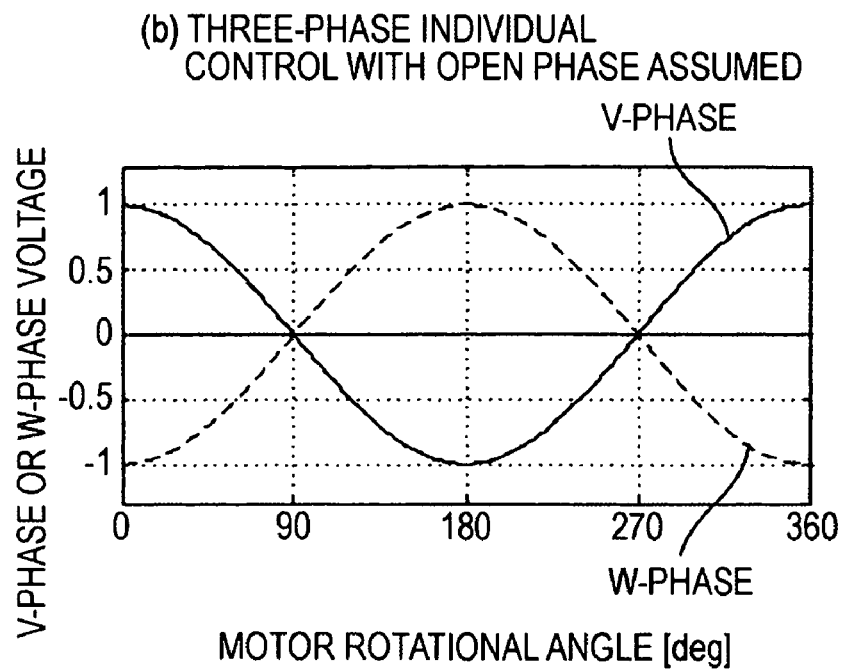
(b) THREE-PHASE INDIVIDUAL CONTROL WITH OPEN PHASE ASSUMED FIG. 10
(a)
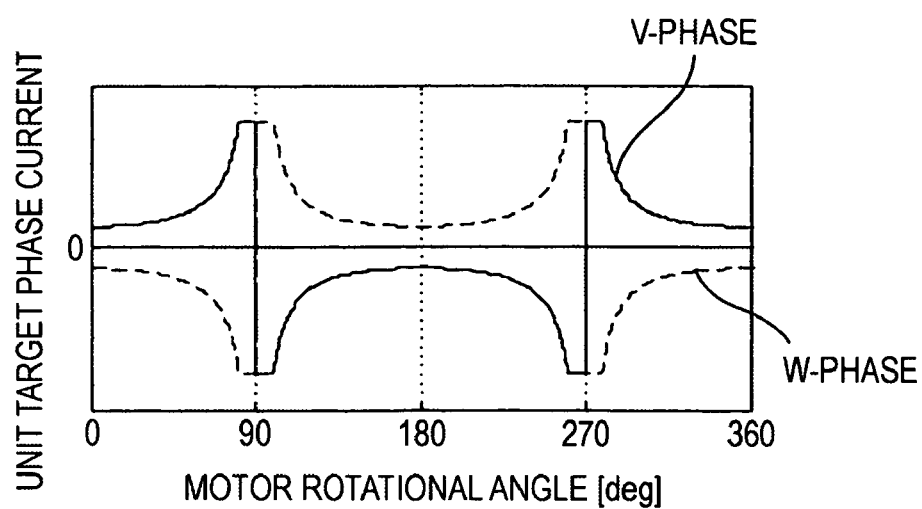
(b)
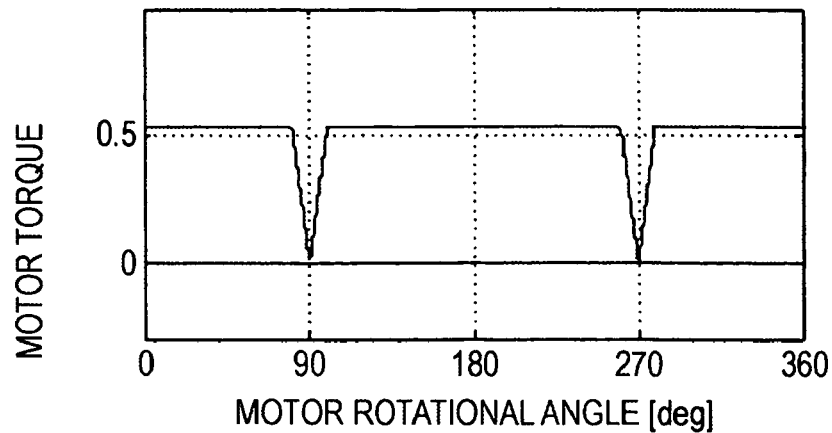

FIG. 18
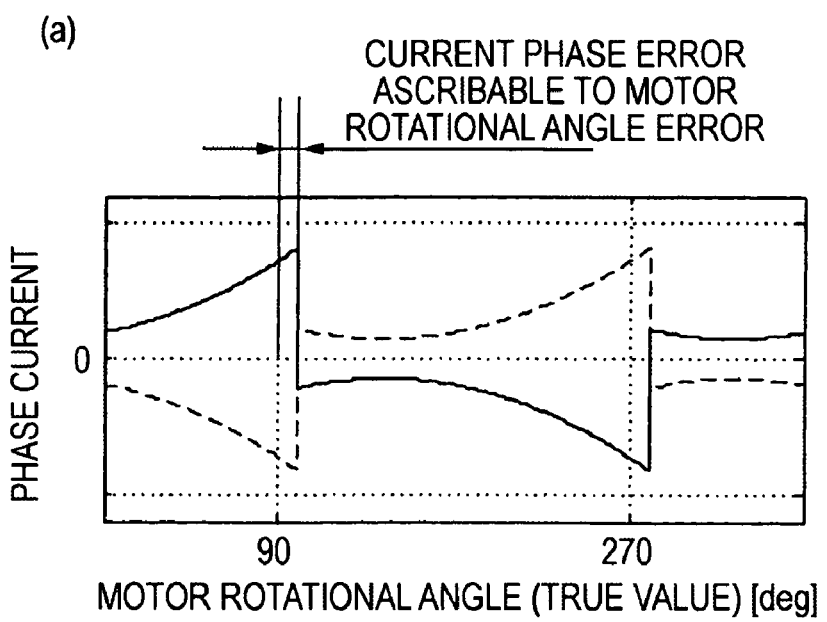
(a) CURRENT PHASE ERROR ASCRIBABLE TO MOTOR ROTATIONAL ANGLE ERROR
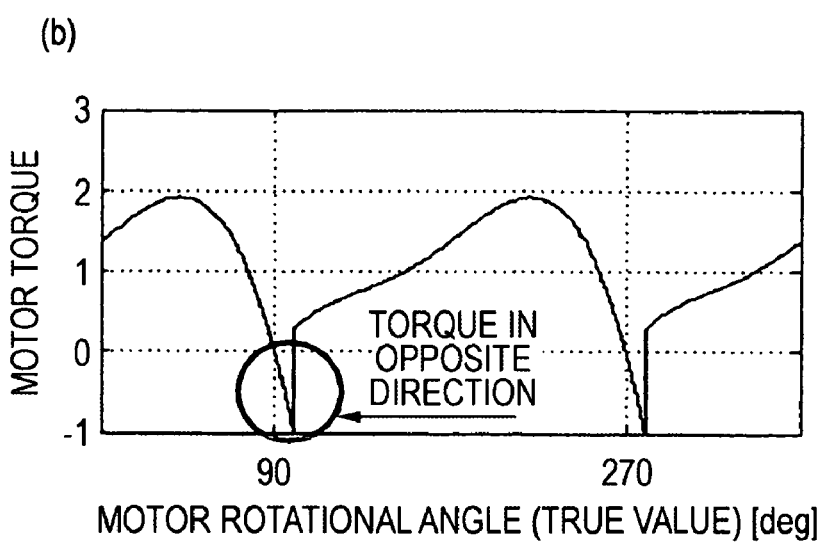
(b)

FIG. 19
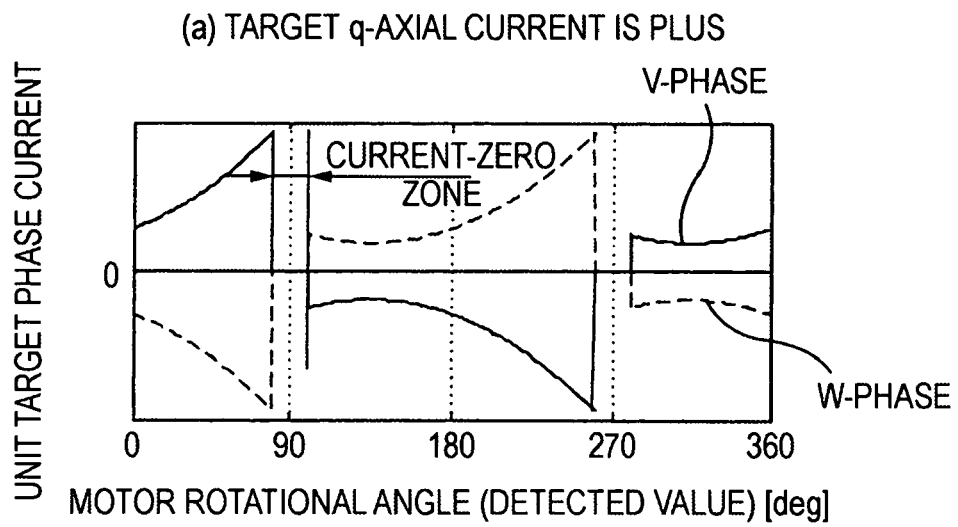
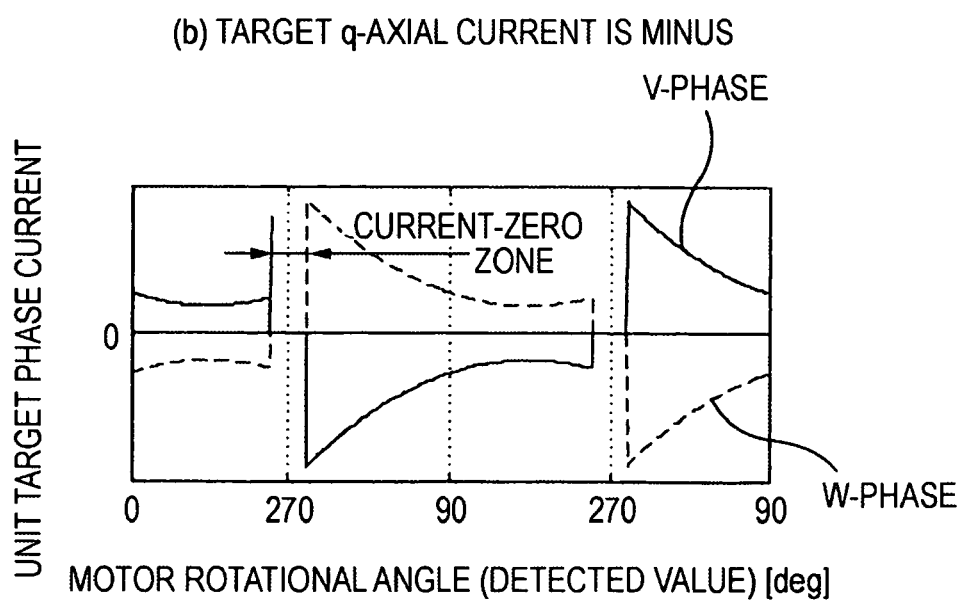

MOTOR CONTROLLER

TECHNICAL FIELD

This invention relates to a control apparatus for an electric motor, and more particularly to a control apparatus for an electric motor as can continuously run the electric motor even in the case of the occurrence of a state where any current does not flow through one phase of the multiphase electric motor, and as is well suited for use in, for example, an electrically-operated power steering apparatus.

BACKGROUND ART

As an example of a prior-art apparatus, there is one disclosed in, for example, JP-A-2002-27779 (termed "Patent Document 1"). The example stated in Patent Document 1 has a configuration wherein, as shown in FIG. 1 of the document, a second power source is disposed between the neutral point of a multiphase motor and the bus of the negative electrodes of an inverter, whereby even in the case of an abnormality in which one phase of the motor or the inverter has been disconnected, a motor torque can be outputted, and a torque ripple can be made small.

Besides, as another prior-art example, there is one wherein, as stated in JP-A-10-181617 (termed "Patent Document 2"), a second power source is not disposed between the neutral point of a multiphase motor and the bus of the negative electrodes of an inverter, and an abnormality in which one phase of the motor or the inverter has been disconnected is coped with by making the magnitude of a drive current smaller than in a normal mode, so as to output a motor torque smaller than in the normal mode.

Further, as another prior-art example, there is one wherein, as stated in JP-A-2003-26020 (termed "Patent Document 3"), a second power source is not disposed between the neutral point of a multiphase motor and the bus of the negative electrodes of an inverter, and even in the case of an abnormality in which one phase of the motor or the inverter has been disconnected, an ordinary control method is continued, thereby to output a motor torque. A "dq" control is the commonest as the ordinary control method.

Patent Document 1: JP-A-2002-27779
Patent Document 2: JP-A-10-181617
Patent Document 3: JP-A-2003-26020

DISCLOSURE OF THE INVENTION

Problems that the Invention is to Solve

With the apparatus as stated in Patent Document 1, however, the second power source needs to be disposed between the neutral point of the electric motor and the bus of the negative electrodes of the inverter, in addition to a power source which is usually employed for feeding electric power to the electric motor, and there is the problem that the apparatus is high in cost.

Besides, in each apparatus wherein the second power source is not disposed between the neutral point of the multiphase motor and the bus of the negative electrodes of the inverter, problems as stated below are involved in the case of the abnormality in which one phase of the three-phase AC motor or the inverter has been disconnected.

In the case of such an abnormality, there is a motor rotational angle at which the motor torque infallibly becomes zero whatever control may be performed, and a torque ripple is large. Besides, when a motor rotational angular speed becomes zero to stop the rotation of the electric motor, in the vicinity of the rotational angle at which the motor torque becomes zero, there is the problem that the motor torque is not generated unless the motor is rotated by exerting a force from outside. It is therefore difficult to bring the abnormal motor operation close to the operation of the motor in the normal mode.

The apparatus in Patent Document 2 is directed toward the brushless motor of three or more phases. When the abnormality in which one phase of the motor or the inverter has been disconnected occurs, merely the oscillation of the motor torque becomes large in case of four or more phases, but in case of three phases, the motor rotational angle at which the motor torque cannot be generated exists as stated above, so that the apparatus is not suited to the three-phase brushless motor. Besides, the abnormality is coped with by making the drive current small, but a drive scheme is not altered.

Besides, when the ordinary control scheme is employed in the case of the abnormality in which one phase of the three-phase AC motor or the inverter has been disconnected, as in Patent Document 3, the voltages of normal two phases become waveforms whose phases shift 120 degrees as in the ordinary mode, as shown in FIG. 6(a) of the present application to be referred to later, and additional voltages must be applied in order to obtain the terminal voltage between the two normal phases as is originally necessary, so that the voltage of a power source cannot be effectively used. Besides, an upper limit value based on the magnitude of a power source voltage is liable to be reached, and a phenomenon in which the necessary terminal voltage is not obtained is liable to arise.

Further, when the ordinary "dq" control is performed in the case of the occurrence of the abnormality, a motor torque shape as shown in FIG. 7(b) of the present application to be referred to later is assumed, and hence, the problems stated in the above sector [0005] are not improved, the torque ripple is large, there develops the phenomenon that a period for which the motor torque is not generated continues, and it is difficult to bring the abnormal motor operation close to the operation of the motor in the normal mode. Therefore, an electrically-operated power steering apparatus which includes such a control scheme has the problem that a sense of unease felt by a driver is serious.

This invention has been made in view of the problems of the prior-art apparatuses as stated above, and it has for its object to provide a control apparatus for an electric motor in which, even in case of the occurrence of an abnormality where any current does not flow through one phase of the electric motor or an inverter on account of disconnection or the like, a current suitable for the abnormality is caused to flow through the electric motor, and the output of a motor torque can be continued.

Besides, this invention has for its object to provide a control apparatus for an electric motor in which, even in case of the occurrence of an abnormality where any current does not flow through one phase of the electric motor or an inverter on account of disconnection or the like, the terminal voltage between two normal phases as is necessary can be efficiently generated.

Besides, this invention has for its object to provide a control apparatus for an electric motor in which, even in case of the occurrence of an abnormality where any current does not flow through one phase of the electric motor or an inverter on account of disconnection or the like, the shapes of the target currents of respective phases can be designated, and the shape of a motor torque to be outputted by the electric motor can be designated.

Further, this invention has for its object to provide a control apparatus for an electric motor in which, even in case of the occurrence of an abnormality where any current does not flow through one phase of the electric motor or an inverter on account of disconnection or the like, the torque ripple of a torque to be generated by the electric motor can be made small, and a phenomenon where a period for which the motor torque is generated by the electric motor continues can be suppressed.

Still further, this invention has for its object to provide a control apparatus for an electric motor as is suited for application to a control apparatus for a three-phase brushless motor as is employed for driving an electrically-operated power steering apparatus.

Means for Solving the Problems (1) An electric motor control apparatus of this invention consists in an electric motor control apparatus for a multiphase AC electric motor, including motor rotational angle detection means for calculating a rotational angle of the electric motor, a current detection circuit which calculates currents flowing through respective phases of the electric motor, current control means for determining multiphase voltage commands in accordance with a target q-axial current corresponding to a target value of a torque to be generated by the electric motor, and the detection currents of respective phases and the motor rotational angle from the current detection circuit and the motor rotational angle detection means, a switching-element drive circuit which subjects the multiphase voltage commands from the current control means, to PWM modulation, and which gives commands of switching operations to an inverter, and the inverter which receives switching operation signals from the switching-element drive circuit, and which applies voltages to the respective phases of the electric motor and causes currents to flow therethrough; the electric motor control apparatus being so configured that the current control means comprises normal-mode current control means for use in a normal mode, abnormal-mode current control means for use in an abnormal mode, abnormality decision means for detecting an abnormal state of the electric motor or the inverter, and changeover means for selecting either the normal-mode current control means or the abnormal-mode current control means on the basis of a command from the abnormality decision means, wherein in case of occurring abnormality to one phase of the electric motor or the inverter, the abnormal-mode current control means is selected by the changeover means, and abnormal-mode multiphase voltage commands generated by the abnormal-mode current control means are set as the multiphase voltage commands for the switching-element drive circuit.

(2) Besides, the electric motor control apparatus of this invention consists in the electric motor control apparatus of the above item (1), wherein the abnormal-mode current control means generates the voltage commands of the respective phases so as to satisfy a balanced condition in which a sum of the voltage commands of the normal phases except the phase undergoing the abnormality becomes zero, thereby to output the generated voltage commands as the abnormal-mode multiphase voltage commands.

(3) Besides, the electric motor control apparatus of this invention consists in the electric motor control apparatus of the above item (1), wherein:

the abnormal-mode current control means includes:

target phase current waveshaping means for calculating target currents of the normal phases except the phase undergoing the abnormality, in accordance with the target q-axial current corresponding to the target value of the motor torque, and the motor rotational angle, so as to satisfy a balanced condition in which a sum of the target currents becomes zero, and for outputting the calculated target currents as multiphase target currents; and controllers which generate the abnormal-mode multiphase voltage commands on the basis of the target currents of the normal phases, and the detection currents of the respective phases from the current detection circuit;

the target currents of the respective phases being individually designated by the target phase current waveshaping means, thereby to individually control currents of the respective phases of the electric motor.

(4) Besides, the electric motor control apparatus of this invention consists in the electric motor control apparatus of the above item (1), wherein:

the abnormal-mode current control means includes:

target phase current waveshaping means for calculating target currents of the respective phases in accordance with the target q-axial current corresponding to the target value of the motor torque, and the motor rotational angle, so as to satisfy a balanced condition in which a sum of the target currents of the normal phases except the phase undergoing the abnormality becomes zero, and for outputting the calculated target currents as multiphase target currents;

two-phase conversion means for subjecting the multiphase target currents to two-phase conversion on the basis of the motor rotational angle, thereby to generate a waveshaped d-axial target current and a waveshaped q-axial target current; and dq control means for executing a dq control on the basis of the waveshaped d-axial target current and the waveshaped q-axial target current from the two-phase conversion means, the detection currents of the respective phases from the current detection circuit, and the motor rotational angle and generating the multiphase voltage commands;

the target currents of the respective phases being individually designated by the target phase current waveshaping means, so as to execute the dq control in which the waveshaped d-axial target current and the waveshaped q-axial target current are target signals of a d-axial current and a q-axial current, with the dq control means.

(5) Besides, the electric motor control apparatus of this invention consists in the electric motor control apparatus of the above item (1), wherein:

the abnormal-mode current control means includes:

dq control means for executing a dq control on the basis of the target q-axial current corresponding to the target value of the motor torque, the detection currents of the respective phases from the current detection circuit, and the motor rotational angle, and for generating voltage commands of the respective phases;

target phase current waveshaping means for calculating target currents of the respective phases in accordance with the target q-axial current corresponding to the target value of the motor torque, and the motor rotational angle, so as to satisfy a balanced condition in which a sum of the target currents of the normal phases except the phase undergoing the abnormality becomes zero, and for outputting the calculated target currents as multiphase target currents; and voltage waveshaping means including two-phase conversion means for subjecting the multiphase target currents to two-phase conversion on the basis of the motor rotational angle, thereby to generate a waveshaped d-axial target current and a waveshaped q-axial target current, and means for subtracting a target d-axial current and the target q-axial current from the waveshaped d-axial target current and the waveshaped q-axial target current, for generating a d-axial voltage command and a q-axial voltage command from the subtraction values, and for generating voltage waveshaping signals of the respective phases on the basis of the d-axial voltage command, the q-axial voltage command and the motor rotational angle;

the multiphase voltage commands being outputted by adding the voltage commands of the respective phases from the dq control means and the voltage waveshaping signals of the respective phases from the voltage waveshaping means.

ADVANTAGES OF THE INVENTION

According to the electric motor control apparatus of this invention, even in case of the occurrence of an abnormality in which any current does not flow through one phase of an electric motor or an inverter on account of disconnection or the like, a current suitable for the abnormality can be caused to flow through the electric motor, and the output of a motor torque can be continued.

Besides, according to the electric motor control apparatus of this invention, even in case of the occurrence of an abnormality in which any current does not flow through one phase of an electric motor or an inverter on account of disconnection or the like, the terminal voltage between two normal phases as is necessary can be efficiently generated.

Besides, according to the electric motor control apparatus of this invention, even in case of the occurrence of an abnormality in which any current does not flow through one phase of an electric motor or an inverter on account of disconnection or the like, the shapes of the target currents of respective phases can be designated, and the shape of a motor torque to be outputted by the electric motor can be designated.

Further, according to the electric motor control apparatus of this invention, even in case of the occurrence of an abnormality in which any current does not flow through one phase of an electric motor or an inverter on account of disconnection or the like, the torque ripple of a torque to be generated by the electric motor can be made small, and a phenomenon where a period for which the motor torque is not generated by the electric motor continues can be suppressed.

Still further, according to the electric motor control apparatus of this invention, it is possible to obtain a control apparatus for an electric motor as is well suited for application to a control apparatus for a three-phase brushless motor as is employed for driving an electrically-operated power steering apparatus.

BEST MODE FOR CARRYING OUT THE INVENTION

Embodiment 1

Embodiment 1 of this invention will be described with reference to the drawings.

A case where this invention is applied to a three-phase brushless motor will be described by way of example below, but this invention can also be used for an electric motor which is rotationally driven by a multiphase alternating current.

FIG. 1 is a schematic block diagram showing the general configuration of an electric motor control apparatus according to Embodiment 1 of this invention.

Referring to FIG. 1, numeral 10 designates the electric motor control apparatus, and the brushless motor (hereinbelow, also termed "motor") 5 which includes the windings of the three phases of U-, V- and W-phases is controlled by employing the electric motor control apparatus 10.

The electric motor control apparatus 10 receives a signal from a motor angle sensor 6 which detects the rotational angle of the motor 5, and it calculates the rotational angle of the motor by a motor rotational-angle detection circuit 21. Besides, it calculates currents flowing through the respective phases of the motor, by a current detection circuit 22.

As will be stated later, current control means 23 determines three-phase voltage commands in accordance with a motor drive current command (hereinbelow, also termed "target q-axial current") corresponding to the target value of a motor torque, the detection currents of the respective motor phases, and the motor rotational angle. An FET drive circuit 24 subjects the three-phase voltage commands to PWM modulation, and instructs an inverter 25 to perform FET drive. The inverter 25 realizes a chopper control by receiving an FET drive signal, and causes currents to flow through the respective phases of the motor by electric power fed from a power source. The motor torque is generated by the currents flowing through the respective phases.

Next, the current control means 23 will be described with reference to FIG. 2.

As shown in FIG. 2, the current control means 23 includes normal-mode current control means 31 for executing an ordinary control scheme for use in a normal mode, abnormal-mode current control means 30 for use in an abnormal mode, abnormality decision means 32, and changeover means 33, and the two control means can be changed-over.

When the length of a time period for which any detection current remains at zero has reached a value determined beforehand, on the basis of the three-phase detection currents fed from the current detection circuit 22, the abnormality decision means 32 decides that the pertinent phase is in an abnormal state where current does not flow, and it feeds an abnormality decision signal to the abnormal-mode current control means 30 and the changeover means 33 in order to report the presence of the abnormality and the abnormal phase.

The abnormal-mode current control means 30 receives the abnormality decision signal from the abnormality decision means 32, and it stops its function in the normal mode and executes a control corresponding to the abnormal phase in a case where the abnormal phase is any one of the U-, V- and W-phases. In the presence of two or more abnormal phases, the abnormal-mode current control means 30 stops its function and does not produce an output.

The changeover means 33 receives the abnormality decision signal from the abnormality decision means 32, and it outputs three-phase normal-mode voltage commands received from the normal-mode current control means 31, as three-phase voltage commands in a case where the signal of the normal mode has been detected, whereas it outputs three-phase abnormal-mode voltage commands received from the abnormal-mode current control means 30, as three-phase voltage commands in a case where the signal of the abnormal mode has been detected.

The normal-mode current control means 31 is configured as in, for example, the block diagram 31a of FIG. 17, and it executes an ordinary dq control and realizes the generation of a smooth motor torque in the normal mode.

Now, the dq control of the normal-mode current control means 31a shown in FIG. 17 will be described. Two-phase conversion means 136 subjects the detection currents of the U-, V- and W-phases obtained by the current detection circuit, to two-phase conversion in accordance with the motor rotational angle, thereby to output a q-axial current Iq and a d-axial current Id. Subtractors 133 and 134 subtract the q-axial current Iq and d-axial current Id from a target q-axial current Iqr and a target d-axial current Idr so as to feed the differences to a q-axial controller 132 and a d-axial controller 131, respectively.

Besides, the q-axial controller 132 and d-axial controller 131 configured by a PI control, etc. feed a q-axial voltage command and a d-axial voltage command to three-phase conversion means 135, respectively.

The three-phase conversion means 135 subjects the q-axial voltage command and d-axial voltage command to three-phase conversion in accordance with the motor rotational angle, thereby to generate U-, V- and W-phase voltage commands. In this way, the dq control performs a control so that the target q-axial current and target d-axial current corresponding to the target value of the motor torque may be realized as actual currents.

Next, there will be described a case where the abnormality has occurred in one phase of the motor or the inverter, for example, a case where an abnormality such as disconnection has occurred in the U-phase of the motor or the U-phase of the inverter, to incur a state in which any current does not flow through the U-phase.

In the case of the occurrence of such an abnormality, in FIG. 2, the abnormality decision means 32 feeds the abnormality decision signal that "the U-phase is abnormal", to the abnormal-mode current control means 30 and the changeover means 33. Thus, the abnormal-mode current control means 30 operates, and three-phase abnormal-mode voltage commands are fed to the FET drive circuit 24 through the changeover means 33 as the three-phase voltage commands. The abnormal-mode current control means 30 executes a control scheme shown in FIG. 3, in order to perform a current control in which the phase undergoing the abnormality is considered. Now, the control operation of the abnormal-mode current control means 30 will be described with reference to FIGS. 3 and 4.

FIG. 3 is a control block diagram of abnormal-mode current control means 30a in the case where the U-phase is abnormal, and this control scheme shall be called "three-phase individual control with an open phase assumed" below.

The control scheme based on the abnormal-mode current control means 30a as shown in FIG. 3 converts a target q-axial current corresponding to the target value of a motor torque, into target phase currents which are caused to flow through the respective normal phases, in accordance with a motor rotational angle and a motor rotational angular speed. On this occasion, the U-phase target current is set at "0" in consideration of the fact that any current does not flow through the U-phase, and the V-phase target current Iv* and W-phase target current Iw* are calculated so as to satisfy the relationship that the V-phase and W-phase are opposite in sign and equal in absolute value to each other (Iw*=−Iv*) (i.e., to satisfy a balanced condition in which a sum of the target currents of the respective normal phases except the phase undergoing the abnormality becomes zero).

Referring to FIG. 3, target phase current waveshaping means 50 (the details of which will be stated later) generates the V-phase target current in accordance with the target q-axial current, the motor rotational angle, and the motor rotational angular speed obtained by approximately differentiating the motor rotational angle by differentiation means 51, and it feeds the generated target current to a sign inverter 52. The sign inverter 52 multiplies the V-phase target current by "−1", thereby to calculate the W-phase target current. Subtractors 44, 45 and 46 subtract the detection currents of the U-, V- and W-phases obtained by the current detection circuit 22, from the U-, V- and W-phase target currents, and they feed the differences to U-, V- and W-phase controllers 41, 42 and 43 configured by a PI control or the like, respectively. Besides, the U-, V- and W-phase controllers 41, 42 and 43 disposed for the corresponding phases feed U-, V- and W-phase voltage commands to the FET drive circuit 24, respectively, whereby the respective phases are individually controlled in order to realize the target currents obtained by the target phase current waveshaping means 50.

The target phase current waveshaping means 50 has a configuration as shown in FIG. 4 by way of example.

Unit target phase current generation means 71 determines a unit target phase current (hereinbelow, also termed "variable gain") in accordance with a target q-axial current, a motor rotational angle, and a motor rotational angular speed obtained by approximately differentiating the motor rotational angle by the differentiation means 51. Multiplication means 72 multiplies the target q-axial current and the unit target phase current, thereby to calculate a V-phase target current. The unit target phase current signifies the V-phase target current in the case where the magnitude of the target q-axial current is "1".

In the unit target phase current generation means 71, the relations of the unit target phase current to the target q-axial current, the motor rotational angle and the motor rotational angular speed are, for example, ones shown in FIG. 5.

A generation scheme for the unit target phase current as shown in FIG. 5 shall be called "drive scheme corresponding to a torque direction".

This scheme changes-over the relations between the motor rotational angle and the unit target phase current in accordance with the direction of the target q-axial current which corresponds to the target value of the motor torque., and it calculates the unit target phase current by employing the relation of FIG. 5(a) when the target q-axial current is plus or the relation of FIG. 5(b) when the target q-axial current is minus. The motor rotational angle on the axis of abscissas is on the scale of the electrical angle of the motor.

When the current control is performed so as to realize such a target phase current, the motor torque assumes a shape as shown in FIG. 5(c) or (d), in accordance with the direction of the target q-axial current. Although a sinusoidal wave and a rectangular wave exist as the ordinary shapes of three-phase currents, shapes shown in FIGS. 5(a) and (b) are quite different from them.

Incidentally, although the motor rotational angular speed is not used in the calculation of the unit target phase current, an example using the motor rotational angular speed will be described in Embodiment 4 later.

Besides, although the unit target phase currents shown in FIG. 5 have been changed-over in accordance with the direction of the target q-axial current, a motor torque detection signal may well be employed instead of the target q-axial current.

Here, means for calculating the motor torque detection signal will be described. The motor torque detection signal is obtained in such a way that the detection currents of the U-, V- and W-phases obtained by the current detection circuit 22 are subjected to two-phase conversion by two-phase conversion means not shown, thereby to calculate a d-axial current and a q-axial current, and that the q-axial current is multiplied by a torque constant.

The reason why the motor torque detection signal can be substituted for the target q-axial current, is that the target q-axial current corresponds to the target value of the motor torque, so the motor torque detection signal obtained by detecting the motor torque has a correlation with the target q-axial current.

FIG. 3 shows the control block diagram of the "three-phase individual control with an open phase assumed" in the case where the abnormality has occurred in the U-phase, but even in a case where any abnormality has developed in the V- or W-phase, the abnormal-mode current control means 30*a* is furnished with a similar "three-phase individual control with an open phase assumed", and the control can be changed-over depending upon the phase in which the abnormality has occurred.

In this manner, in the case where the abnormality has occurred in one phase of the motor or the inverter, the current control is continued by the abnormality-mode current control means instead of the normal-mode current control means, whereby the output of the motor torque from the motor can be continued.

Besides, according to the control apparatus in Embodiment 1 of this invention, advantages as stated below are brought forth.

In the case of the U-phase disconnection abnormality, considering the fact that the currents of the V-phase and W-phase flow in the relationship in which the currents are opposite in sign and equal in absolute value to each other (Iv=−Iw), the V-phase and W-phase target currents are generated so as to satisfy the relationship in which the V-phase and W-phase are opposite in sign and equal in absolute value to each other, and hence, a similar relationship exists in the differences between the target currents and detection currents of the V-phase and W-phase. Since the same controllers are usually employed for the V-phase controller and W-phase controller, the V-phase voltage command and W-phase voltage command which are the outputs of the controllers can be given in a similar relationship. Therefore, the potential difference between the V-phase and W-phase can be fed with the required minimum voltages, and this is efficient.

In contrast, when the prior-art dq control is employed, the V-phase voltage command and W-phase voltage command do not satisfy the relationship in which they are opposite in sign and equal in absolute value to each other, and hence, additional voltages need to be applied a V-phase terminal and a W-phase terminal in feeding the potential difference between the V-phase and W-phase.

By way of example, in the prior-art dq control, the situation of setting the V-phase voltage at 2 V and the W-phase voltage at 1 V can exist in order to obtain 1 V as a VW terminal voltage, whereas the V-phase voltage and W-phase voltage are respectively set at 0.5 V and −0.5 V in the "three-phase individual control with an open phase assumed" in this invention.

FIG. 6 compares the voltages of the V- and W-phases as are required for generating the V and W terminal voltages of the same magnitudes by sinusoidal drive, as to the prior-art dq control and the "three-phase individual control with an open phase assumed" of Embodiment 1 of this invention.

The maximum voltage of the prior-art dq control as shown in FIG. 6(*a*) is 15% larger as compared with the maximum voltage of the "three-phase individual control with an open phase assumed" as shown in FIG. 6(*b*). In this manner, the voltage of the dq control is superfluously larger than the voltage of the "three-phase individual control with an open phase assumed", and it is therefore liable to reach an upper limit value based on the magnitude of a power source voltage, so that a phenomenon in which a necessary terminal voltage is not attained is liable to arise.

On the other hand, the "three-phase individual control with an open phase assumed" in this invention does not generate a voltage superfluously, and the voltage is therefore more difficult of reaching the upper limit values based on the magnitude of the power source voltage, than the voltage of the dq control, so that the necessary terminal voltage can be efficiently generated.

Besides, as also stated in the section of the column "problem to be solved by the invention", in the case of the one-line disconnection abnormality, as shown in FIG. 7, there is a motor rotational angle at which the motor torque infallibly becomes zero whatever control may be performed, and hence, a torque ripple is large. Moreover, when the motor rotational angular speed becomes zero to stop the rotation of the electric motor, in the vicinity of the rotational angle at which the motor torque becomes zero, there is the problem that the motor torque is not generated unless the electric motor is rotated by exerting a force from outside. It is therefore difficult to bring the abnormal motor operation close to the operation of the motor in the normal mode.

That is, when the prior-art dq control is employed, means is not disposed for explicitly designating the shapes of the target currents of the respective phases.

In contrast, when the "three-phase individual control with an open phase assumed" of Embodiment 1 of this invention is used, the shapes of the target currents of the respective phases and the shape of the motor torque can be designated in such a way that the shapes of the unit target phase currents are contrived and adjusted by the target phase current waveshaping means 50. Therefore, the abnormal motor operation can be brought close to the operation of the motor in the normal mode in such a manner that the above problem of the fall of the motor torque to zero can be solved.

More specifically, in the unit target phase current generation means 71, the unit target phase current is generated by employing the "drive scheme corresponding to a torque direction" as shown in FIG. 5, whereby the acceleration of the rotation of the motor is enlarged immediately before the motor rotational angle at which the motor torque becomes zero is reached, and the motor can be rotated without stopping at the motor rotational speed at which the motor torque becomes zero. It is therefore possible to prevent the above phenomenon that a period for which the motor torque is not generated continues. Only the V-phase target current is shown in FIG. 8 so as to facilitate understanding the current shape.

This situation will be further detailed below.

Let's take into consideration the fact that the motor torque can exert the acceleration on the rotation of the motor. Then, in a case where the motor torque is in the plus direction and where the motor rotational angular speed is also in the plus direction, the motor rotational angle advances rightwards in FIG. 5(*c*), and immediately before the motor rotational angle at which the motor torque becomes zero is reached, the magnitude of the motor torque enlarges to accelerate the rotation in the plus direction.

On the other hand, in a case where the motor torque is in the plus direction and where the motor rotational angular speed is in the minus direction, that is, in a case where the motor torque is in the direction of decelerating the motor rotation, the motor rotational angle advances leftwards in FIG. 5(*c*), and immediately before the motor rotational angle at which the motor torque becomes zero is reached, the magnitude of the motor torque becomes small to accelerate the rotation in the minus direction. In a case where the motor torque is in the minus direction and where the motor rotational angular speed is also in the minus direction, the motor rotational angle advances leftwards in FIG. 5(*d*), and immediately before the motor rotational angle at which the motor torque becomes zero is reached, the magnitude of the motor torque enlarges to accelerate the rotation in the minus direction. On the other hand, in a case where the motor torque is in the minus direction and where the motor rotational angular speed is in the plus direction, that is, in a case where the motor torque is in the direction of decelerating the motor rotation, the motor rotational angle advances rightwards in FIG. 5(d), and immediately before the motor rotational angle at which the motor torque becomes zero is reached, the magnitude of the motor torque becomes small to accelerate the rotation in the plus direction.

In this manner, the motor can rotate without stopping at the motor rotational angle at which the motor torque becomes zero, and it is therefore possible to prevent the above phenomenon that the period for which the motor torque is not generated continues.

By the way, in the "three-phase individual control with an open phase assumed" in FIG. 3, also the U-phase undergoing the abnormality is provided with the controller, but the U-phase need not be controlled because no current flows therethrough. Therefore, the "three-phase individual control with an open phase assumed" can attain the same advantages without the U-phase controller or the U-phase target current.

Besides, in the abnormal-mode current control means 30a of the "three-phase individual control with an open phase assumed" in FIG. 3, the target phase current waveshaping means 50 has been assumed to calculate the V-phase target current, but the V-phase target current may well be generated in such a way that target phase current waveshaping means 50a calculates the W-phase target current instead of the V-phase target current, and that the W-phase target current is multiplied by −1. In the case of the U-phase disconnection, the V-phase and W-phase are in the relationship in which the currents are opposite in sign and equal in absolute value to each other (Iw=−Iv), and whichever phase is taken as a reference, no problem is posed. Even with such means 50a, V-phase and W-phase voltage commands equal to those of the abnormal-mode current control means 30a of the "three-phase individual control with an open phase assumed" in FIG. 3 can be calculated, an equivalent control is possible, and the same advantages as those of the "three-phase individual control with an open phase assumed" in FIG. 3 can be attained in the case of the abnormality of the U-phase.

Besides, the target phase current waveshaping means 50 need not employ the motor rotational angular speed as indicated in Embodiment 1, in calculating the V-phase target current.

Further, although the case of the three-phase motor has been mainly explained in Embodiment 1, the present invention is similarly applicable even to a motor of four or more phases by designating target phase currents individually for the respective phases and disposing controllers individually. In case of the four-phase motor, when any abnormality has occurred in one phase, a motor rotational angle at which a motor torque becomes zero does not exist, but a torque ripple enlarges. Therefore, the torque ripple can be made small as in the case of the three-phase motor, in such a way that the shape of a phase current is designated by target phase current waveshaping means.

Embodiment 2

FIG. 9 is a control block diagram of abnormal-mode current control means 30d according to Embodiment 2 of this invention.

In the abnormal-mode current control means 30a of the "three-phase individual control with an open phase assumed" in FIG. 3 in Embodiment 1, the U-phase, V-phase and W-phase controllers 41, 42 and 43 have been employed, but the U-phase and W-phase controllers may well be omitted as shown in FIG. 9.

In general, a brushless motor has three-phase windings configured without deviation, and hence, in case of the disconnection of the U-phase, the V-phase and W-phase have the relationship in which their currents are opposite in sign and equal in absolute value to each other (Iw=−Iv), so that no problem is posed even when the V-phase and W-phase controllers are assumed to be the same ones. It is consequently allowed to dispose only one controller.

In the configuration of FIG. 9, the V-phase voltage command outputted from the V-phase controller 42 is multiplied by −1 by a multiplier 52a, and the resulting product is calculated as the W-phase voltage command. The U-phase voltage command is outputted as zero. In this manner, the U-phase, V-phase and W-phase voltage commands equal to those of the abnormal-mode current control means 30a of the "three-phase individual control with an open phase assumed" in FIG. 3 can be calculated.

With the configuration of FIG. 9, a control equivalent to that of the "three-phase individual control with an open phase assumed" in Embodiment 1 is possible, and the same advantages as those of the "three-phase individual control with an open phase assumed" in FIG. 3 can be attained in the case of the abnormality of the U-phase.

Embodiment 3

FIG. 10 is a diagram showing examples of a unit target phase current and a motor torque waveform according to Embodiment 3 of this invention.

In the unit target phase current generation means 71 in Embodiment 1, the relationship shown in FIG. 5 has been applied as the relationship of the unit target phase current versus the motor rotational angle, and the "drive scheme corresponding to a torque direction" has been employed, but a relationship shown in FIG. 10 may well be employed by way of example. A scheme for generating the unit target phase current as shown in FIG. 10 shall be called "inverse sinusoidal drive scheme".

As shown in FIG. 10(a), this scheme calculates the inverse number of a cosine concerning the motor rotational angle, as the unit target phase current. However, the unit target phase current is saturated by setting an upper limit value, so as not to become infinity. The motor rotational angle on the axis of abscissas is on the scale of the electrical angle of the motor.

When the current control is performed so as to realize such a target phase current, the motor torque becomes trapezoidal as shown in FIG. 10(b).

The unit target phase current which is generated in this scheme depends only on the motor rotational angle, but it has such a feature that the waveform of one cycle undergoes vertical fluctuations three times, unlike in a sinusoidal wave or a rectangular wave which is usually utilized. The sinusoidal wave or the rectangular wave undergoes one time of vertical fluctuation in one cycle.

Mean magnitudes are equalized in the motor torque waveform in FIG. 10(b), and the motor torque waveform in the case of the ordinary dq control which employs the sinusoidal drive shown in FIG. 7(b), and when the fluctuation widths of the torques are compared on the basis of the figures, it is seen that the fluctuation width is nearly 50% smaller in FIG. 10(b).

In this manner, in the unit target phase current generation means 71, the unit target phase current is generated by employing the "inverse sinusoidal drive scheme corresponding to a rotating direction" shown in FIG. 10, whereby the motor torque shape can be made trapezoidal as shown in FIG. 10(b), and the amplitude of the torque ripple can be made smaller as compared with that of the motor torque in the case of the ordinary dq control which employs the sinusoidal drive shown in FIG. 7(b).

Embodiment 4

FIG. 11 is a diagram showing examples of a unit target phase current and a motor torque waveform according to Embodiment 4 of this invention.

In the unit target phase current generation means 71 in Embodiment 1, the relationship shown in FIG. 5 has been applied as the relationship of the motor rotational angle and the unit target phase current, and the "drive scheme corresponding to a torque direction" has been employed, but a relationship shown in FIG. 11 may well be employed by way of example. A scheme for generating the unit target phase current as shown in FIG. 11 shall be called "drive scheme corresponding to a rotating direction".

This scheme according to Embodiment 4 changes-over the relations between the motor rotational angle and the unit target phase current, in accordance with the motor rotational direction, and it calculates the unit target phase current by employing the relation of FIG. 11(a) when the motor rotational angular speed is plus, while it does by employing the relation of FIG. 11(b) when the motor rotational angular speed is minus. The motor rotational angle on the axis of abscissas is on the scale of the electrical angle of the motor.

When the current control is performed so as to realize such a target phase current, the motor torque assumes a shape as shown in FIGS. 11(c) or (d), in correspondence with the motor rotational direction.

As also stated in Embodiment 1, in the case where any abnormality has occurred in one phase of the motor or the inverter, as shown in FIG. 7, the motor torque infallibly becomes zero at a certain specified motor rotational angle whatever control means may be employed. Therefore, when the motor rotational angular speed becomes zero to stop the rotation of the motor, in the vicinity of the rotational angle at which the motor torque becomes zero, there is sometimes posed the problem that the motor torque is not generated unless the motor is rotated by exerting a force from outside.

In such a case, in the unit target phase current generation means 71, the unit target phase current is generated by employing the "drive scheme corresponding to a rotating direction" shown in FIG. 11, whereby subject to the agreement between the directions of the motor torque and the motor rotational angular speed, the magnitude of the motor torque can be enlarged to accelerate the rotation of the motor, immediately before the motor rotational angle at which the motor torque becomes zero is reached. It is therefore possible to prevent the above phenomenon that a period for which the motor torque is not generated continues.

Embodiment 5

FIG. 12 is a diagram showing examples of a unit target phase current and a motor torque waveform according to Embodiment 5 of this invention. A scheme for generating the unit target phase current as shown in FIG. 12 shall be called "drive scheme corresponding to an acceleration rotational direction".

In Embodiment 5, in generating the unit target phase current, a motor rotational angular acceleration is used in addition to a motor rotational angle and a motor rotational angular speed. The motor rotational angular acceleration can be obtained in such a way that the motor rotational angular speed obtained by the differentiation means 51 is further approximately differentiated by similar differentiation means.

Likewise to the "drive scheme corresponding to a rotating direction" shown in FIG. 11, the scheme here changes-over the relations between the motor rotational angle and the unit target phase current, in accordance with the motor rotational direction. Further, the scheme alters the magnitude of the unit target phase current in accordance with the motor rotational angular acceleration. The unit target phase current is calculated by employing the relation of FIG. 12(a) when the motor rotational angular speed is plus, or the relation of FIG. 12(b) when the motor rotational angular speed is minus. As shown in FIG. 12(a), when the motor rotational angular acceleration is small subject to the plus motor rotational angular speed, the magnitude of the unit target phase current is enlarged, and as shown in FIG. 12(b), when the motor rotational angular acceleration is large subject to the minus motor rotational angular speed, the magnitude of the unit target phase current is enlarged. The motor rotational angle on the axis of abscissas is on the scale of the electrical angle of the motor. When the current control is performed so as to realize such a target phase current, the motor torque assumes a shape as shown in FIGS. 12(c) or (d), in correspondence with the motor rotational direction and the motor rotational angular acceleration.

Also in Embodiment 5, as in Embodiment 4, in the unit target phase current generation means 71, the unit target phase current is generated by employing the "drive scheme corresponding to an acceleration rotating direction" shown in FIG. 12, whereby subject to the agreement between the directions of the motor torque and the motor rotational angular speed, the magnitude of the motor torque can be enlarged to accelerate the rotation of the motor, immediately before the motor rotational angle at which the motor torque becomes zero is reached. Further, when the magnitude of the acceleration is small, the magnitude of the motor torque can be enlarged to accelerate the rotation of the motor still more. It is accordingly possible to prevent the phenomenon that a period for which the motor torque is not generated continues.

Embodiment 6

FIG. 13 is a control block diagram of abnormal-mode current control means 30b according to Embodiment 6 of this invention.

Although the "three-phase individual control with an open phase assumed" in FIG. 3 has been employed as the abnormal-mode current control means in Embodiment 1, a similar control is possible even with a control system on dq coordinates, and hence, one aspect thereof will be explained below. The abnormal-mode current control means executes a control scheme shown in FIG. 13, instead of the "three-phase individual control with an open phase assumed" in FIG. 3 as has been employed in Embodiment 1. The control scheme shown in FIG. 13 shall be called "dq control with an open phase assumed".

Although the example as shown in FIG. 13 is indicated in Embodiment 6, the abnormal-mode current control means employing the control system on the dq coordinates exists also in any other aspect by a modification based on the linearities of control blocks.

The control scheme shown in FIG. 13 generates a waveshaped target q-axial current Iqr and a waveshaped target d-axial current Idr in dq-axial target current waveshaping means 80 in accordance with a target q-axial current, a motor rotational angle and a motor rotational angular speed. On this occasion, the currents Iqr and Idr are target signals in which an abnormal phase is considered, and they can be followed up by employing the ordinary dq control system.

The abnormal-mode current control means 30b of the "dq control with an open phase assumed" shown in FIG. 13 will be further detailed below.

The dq-axial target current waveshaping means 80 generates a V-phase target current in target phase current waveshaping means 50 in accordance with the target q-axial current Iq*, the motor rotational angle, and the motor rotational angular speed obtained by approximately differentiating the motor rotational angle by differentiation means 51, and it feeds the V-phase target current to a sign inverter 52.

The sign inverter 52 multiplies the V-phase target current by −1, thereby to calculate a W-phase target current.

Two-phase conversion means A 55 subjects U-, V- and W-phase target currents to two-phase conversion in accordance with the motor rotational angle, thereby to output the waveshaped target q-axial current Iqr and the waveshaped target d-axial current Idr.

Two-phase conversion means B 86 subjects the detection currents of the U-, V- and W-phases obtained by a current detection circuit 22, to two-phase conversion in accordance with the motor rotational angle, thereby to output a q-axial current Iq and a d-axial current Id. Subtractors 83 and 84 subtract the q-axial current Iq and d-axial current Id from the waveshaped target q-axial current Iqr and the waveshaped target d-axial current Idr so as to feed the differences to a q-axial controller 82 and a d-axial controller 81, respectively.

Besides, the q-axial controller 82 and d-axial controller 81 configured by a PI control, etc. generate a q-axial voltage command and a d-axial voltage command and feed the voltage commands to three-phase conversion means 85, respectively.

The three-phase conversion means 85 subjects the q-axial voltage command and the d-axial voltage command to three-phase conversion in accordance with the motor rotational angle, so as to generate U-, V- and W-phase voltage commands and feed them to an FET drive circuit 24.

In the "dq control with an open phase assumed", a situation till the generation of the U-, V- and W-phase target currents in which the abnormal phase is considered is the same as in Embodiment 1. The "dq control with an open phase assumed" converts the U-, V- and W-phase target currents into the waveshaped q-axial target current Iqr and waveshaped d-axial target current Idr in which the abnormal phase is considered. With these target currents, the control based on the dq coordinate system can be realized even in the state of a one-phase abnormality.

Since the target phase current waveshaping means 50 is the same as described in Embodiment 1, it shall be omitted from detailed description, and it has, for example, the configuration as shown in FIG. 4. Unit target phase current generation means 71 determines a unit target phase current (hereinbelow, also termed "variable gain") in accordance with the target q-axial current, the motor rotational angle, and the motor rotational angular speed obtained by approximately differentiating the motor rotational angle by the differentiation means 51. Multiplication means 72 multiplies the target q-axial current and the unit target phase current, thereby to calculate the V-phase target current. The unit target phase current signifies the V-phase target current in the case where the magnitude of the target q-axial current is As the scheme for generating the unit target phase current in the unit target phase current generation means 71, it is possible to similarly use any of the "drive scheme corresponding to a torque direction" in FIG. 5, the "inverse sinusoidal drive scheme" in FIG. 10, the "drive scheme corresponding to a rotating direction" in FIG. 11, and the "drive scheme corresponding to an acceleration rotational direction" in FIG. 12 as have been shown in the foregoing embodiments.

Besides, since the waveshaped target q-axial current Iqr corresponds to that target value of a motor torque in which the abnormality of one phase is considered, the shape thereof becomes the same as in FIG. 5(c) or (d) in the case of the "drive scheme corresponding to a torque direction", as in FIG. 10(b) in the case of the "inverse sinusoidal drive scheme", as in FIG. 11(c) or (d) in the case of the "drive scheme corresponding to a rotating direction", or as in FIG. 12(c) or (d) in the case of the "drive scheme corresponding to an acceleration rotational direction".

Besides, the control block diagram of the "dq control with an open phase assumed" in the case where the abnormality has occurred in the U-phase is shown in FIG. 13, but even in a case where any abnormality has occurred in the V- or W-phase, the abnormality-mode current control means is furnished with a similar "dq control with an open phase assumed", and the control can be changed-over depending upon the phase in which the abnormality has occurred.

In this manner, the "dq control with an open phase assumed" generates the target value in consideration of the motor torque which can be realized by the normal two phases except one disconnected phase, and it gives the command of the target value to the dq control system, whereby the control suited to the one-phase disconnection state can be realized, and the same advantages as those of Embodiment 1 as stated before are achieved.

That is, in the case where the abnormality has occurred in one phase of the motor or the inverter, the current control is continued by the abnormal-mode current control means replacing normal-mode current control means, whereby the output of the motor torque can be continued from the motor.

Besides, likewise to the "three-phase individual control with an open phase assumed", the "dq control with an open phase assumed" does not generate a voltage superfluously, and the voltage is therefore more difficult of reaching the upper limit values based on the magnitude of a power source voltage, than the voltage of the ordinary dq control, so that a necessary terminal voltage can be efficiently generated.

Moreover, likewise to the "three-phase individual control with an open phase assumed", the "dq control with an open phase assumed" is capable of adjusting the motor torque shape by adjusting the unit target phase current as in FIG. 5, FIG. 10, FIG. 11 or FIG. 12. Therefore, the abnormal motor operation can be brought close to the operation of the motor in the normal mode in such a manner that the phenomenon of the continuation of a period for which the motor torque is not generated can be suppressed, and that the amplitude of a torque ripple can be made small.

Embodiment 7

FIG. 14 is a control block diagram of abnormal-mode current control means 30c according to Embodiment 7 of this invention.

Although the "three-phase individual control with an open phase assumed" in FIG. 3 has been employed as the abnormal-mode current control means in Embodiment 1, a similar control is possible even with a control system on dq coordinates, and one aspect thereof has been explained in Embodiment 6. These aspects have had the feature that the U-, V- or W-phase or dq-axial target current is generated considering the abnormality of one phase. Here in Embodiment 7, there will be explained an aspect in which voltage commands that are outputted by ordinary control means such as a dq control are modified, whereby voltage commands in which the abnormality of one phase is considered can be generated.

Abnormal-mode current control means executes a control scheme shown in FIG. 14, instead of the "three-phase individual control with an open phase assumed" in FIG. 3 as employed in Embodiment 1. The control scheme shown in FIG. 14 shall be called "voltage waveshaping dq control with an open phase assumed". Besides, FIG. 14 is the control block diagram in the case where the U-phase is abnormal. Besides, although the example as shown in FIG. 14 is indicated in Embodiment 7, the abnormal-mode current control means employing modification means in a portion for generating the voltage commands exists also in any other aspect by a modification based on the linearities of control blocks.

Referring to FIG. 14, abnormal-mode current control means 30c ("voltage waveshaping dq control with an open phase assumed") generates U-phase, V-phase and W-phase voltage waveshaped signals Vus, Vvs and Vws in voltage waveshaping means 101 in accordance with a target q-axial current, a motor rotational angle and a motor rotational angular speed.

Besides, dq control means 100 receives the target q-axial current Iq*, the motor rotational angle, and the detection currents of the U-, V- and W-phases obtained by a current detection circuit 22, and it executes the ordinary dq control, thereby to output U-phase, V-phase and W-phase ordinary voltage commands Vur, Vvr and Vwr.

Further, in adders 102, 103 and 104, the U-phase, V-phase and W-phase voltage waveshaped signals Vus, Vvs and Vws are respectively added to the U-phase, V-phase and W-phase ordinary voltage commands Vur, Vvr and Vwr outputted from the ordinary dq control 100, thereby to generate U-phase, V-phase and W-phase voltage commands Vu*, Vv* and Vw*, which are fed to an FET drive circuit 24.

The dq control 100 will be further detailed.

Two-phase conversion means B 86 subjects the detection currents of the U-, V- and W-phases obtained by the current detection circuit 22, to two-phase conversion in accordance with the motor rotational angle, thereby to output a q-axial current Iq and a d-axial current Id.

Subtractors 83 and 84 subtract the q-axial current Iq and the d-axial current Id from the target q-axial current Iq* and a target d-axial current Id* (which is usually zero), and they feed the resulting differences to a q-axial controller 82 and a d-axial controller 81, respectively. Besides, the q-axial controller 82 and d-axial controller 81 configured of the linear elements of a PI control, etc. feed a q-axial voltage command and a d-axial voltage command to three-phase conversion means B 85, respectively.

The three-phase conversion means B 85 subjects the q-axial voltage command and d-axial voltage command to three-phase conversion in accordance with the motor rotational angle, thereby to generate the U-, V- and W-phase voltage commands Vur, Vvr and Vwr.

Next, the voltage waveshaping means 101 will be detailed.

The voltage waveshaping means 101 generates a V-phase target current in target phase current waveshaping means 50 in accordance with the target q-axial current Iq*, the motor rotational angle, and a motor rotational angular speed obtained by approximately differentiating the motor rotational angle by differentiation means 51, and it feeds the V-phase target current to a sign inverter 52. The sign inverter 52 multiplies the V-phase target current by −1, thereby to calculate a W-phase target current. Two-phase conversion means A 55 subjects the U-, V- and W-phase target currents to two-phase conversion in accordance with the motor rotational angle, so as to output a waveshaped target q-axial current Iqr and a waveshaped target d-axial current Idr.

Subtractors 112 and 113 subtract the target q-axial current Iq* and a target d-axial current Id* (which is usually zero) from the waveshaped target q-axial current Iqr and the waveshaped target d-axial current Idr, and they feed the resulting differences to a q-axial controller 111 and a d-axial controller 110, respectively. Besides, the q-axial controller 111 and d-axial controller 110 configured of the linear elements of a PI control, etc. feed a q-axial voltage command and a d-axial voltage command to three-phase conversion means 114, respectively.

The three-phase conversion means 114 subjects the q-axial voltage command and the d-axial voltage command to three-phase conversion in accordance with the motor rotational angle, thereby to generate the U-phase, V-phase and W-phase voltage waveshaped signals Vus, Vvs and Vws.

The control block diagram of the "voltage waveshaping dq control with an open phase assumed" in the case where the abnormality has occurred in the U-phase is shown in FIG. 14, but even in a case where any abnormality has occurred in the V- or W-phase, the abnormality-mode current control means is furnished with a similar "voltage waveshaping dq control with an open phase assumed", and the control can be changed-over depending upon the phase in which the abnormality has occurred.

Next, in order to explain the advantages of this embodiment 7, it will be described that the "voltage waveshaping dq control with an open phase assumed" shown in FIG. 14 is equivalent to the "dq control with an open phase assumed" explained in Embodiment 6.

The d-axial controllers 81 and 110 and the q-axial controllers 82 and 111 in FIG. 14 are linear elements in which the principle of superposition holds in the input/output relations thereof.

Also, as to the three-phase conversion means A 114 and the three-phase conversion means B 85, when the motor rotational angle is regarded as a time-varying parameter within the elements, the principle of superposition holds in the input/output relations of these elements from the d- and q-axial signals to the three-phase signals, so that the three-phase conversion means can be termed "linear elements". Accordingly, when it is considered that additions or subtractions at the outputs of these elements and additions or subtractions at the inputs thereof are equivalent, the additions of the outputs of the three-phase conversion means A 114 and the three-phase conversion means B 85 in the adders 102, 103 and 104 can be replaced with the additions of the inputs of the d-axial controllers 81 and 110 and the q-axial controllers 82 and 111, and the d-axial controllers, q-axial controllers and three-phase conversion means can be made common. It can be understood from this operation that the "voltage waveshaping dq control with an open phase assumed" shown in FIG. 14 is equivalent to the "dq control with an open phase assumed" shown in FIG. 13.

As stated above, the abnormal-mode current control means 30c of the "voltage waveshaping dq control with an open phase assumed" configured as shown in FIG. 14 is equivalent to the abnormal-mode current control means 30b of the "dq control with an open phase assumed" configured as shown in FIG. 13, and it accordingly attains the same advantages as those of Embodiment 6.

Embodiment 8

FIGS. 15 and 16 show Embodiment 8 of this invention, and they show an example in which the electric motor control apparatus of this invention as indicated in any of the foregoing embodiments is applied to an electrically-operated power steering apparatus. Incidentally, although a case where the electrically-operated power steering apparatus includes a three-phase brushless motor will be described by way of example, this invention can be used also for another apparatus whose power source is an electric motor that is rotationally driven by a multiphase alternating current.

FIG. 15 is a schematic configurational view of the electrically-operated power steering apparatus according to Embodiment 8 of this invention. Referring to FIG. 15, a steering force exerted on a steering wheel 1 by a driver not shown is transmitted to a rack through a steering shaft 2 and a rack and pinion gear 12, so as to steer wheels 3 and 4. The brushless motor 5 (hereinbelow, also termed "motor") which includes the windings of the three phases of U-, V- and W-phases, is coupled with the steering shaft 2 through a motor speed reduction gear 7. A motor torque (hereinbelow, also termed "assist force") generated by the motor is transmitted to the steering shaft 2 through the motor speed reduction gear 7, and it relieves the steering force which the driver exerts in a steering operation. A torque sensor 8 detects the steering force which has been exerted on the steering shaft 2 in such a way that the driver has steered the steering wheel 1. A controller unit 9 determines the direction and magnitude of the assist force which the motor 5 affords in accordance with the steering force detected by the torque sensor 8, and it controls currents which are to flow from the power source 11 to the motor, in order to generate the assist force. Further, the numeral 6 is a motor angle sensor which detects the rotational angle of the motor.

FIG. 16 is a block diagram showing the configuration of the controller unit 9.

Referring to FIG. 16, the controller unit 9 is configured of a map 20 which calculates a motor drive current command (hereinbelow, also termed "target q-axial current") corresponding to the target value of the motor torque, and the electric motor control apparatus 10. The electric motor control apparatus 10 receives a signal from a motor angle sensor 6 which detects the rotational angle of the motor, and it calculates the rotational angle of the motor by a motor rotational angle detection circuit 21. Besides, it calculates currents flowing through the respective phases of the motor, by a current detection circuit 22.

The map 20 in which motor torques to be outputted are stored beforehand, determines the direction and magnitude of the motor torque corresponding to the steering force detected by the torque sensor 8, thereby to calculate the motor drive current command. Current control means 23 determines three-phase voltage commands in accordance with the motor drive current command, the detection currents of the respective phases, and the motor rotational angle. An FET drive circuit 24 subjects the three-phase voltage commands to PWM modulation, and gives the command of FET drive to an inverter 25. The inverter 25 realizes a chopper control by receiving FET drive signals, and it causes the currents to flow through the respective phases of the motor 5, by electric power fed from a power source. By the currents flowing through the respective phases, the assist force due to the motor is generated.

The electric motor control apparatus 10 is, for example, one shown in Embodiment 1, the "three-phase individual control with an open phase assumed" is executed in the abnormal-mode current control means 30a, and the "drive scheme corresponding to a torque direction" in FIG. 5 is executed in the unit target phase current generation means 71.

Here will be described the problems of an electrically-operated power steering apparatus in the case of a one-phase disconnection abnormality.

As also stated in Embodiment 1, as shown in FIG. 7, in the case of the one-phase disconnection abnormality, there is the motor rotational angle at which the motor torque infallibly becomes zero whatever control may be performed. Therefore, the torque ripple is large to pose the problem that the abnormal motor operation is difficult to be brought close to the operation of the motor in the normal mode. Consequently, an assist force is oscillatory, and a sense of unease felt by a driver is serious. Besides, when the motor rotational angular speed becomes zero to stop the rotation of the electric motor, in the vicinity of the rotational angle at which the motor torque becomes zero, there is the problem that the motor torque is not generated unless the motor is rotated by exerting a force from outside. On this occasion, the assist force based on the motor is not generated before the driver rotates the motor by enlarging a steering force, and hence, the sense of unease felt by the driver is more serious.

In contrast, according to the electrically-operated power steering apparatus configured as stated above, in the case where the abnormality has occurred in one phase of the motor or the inverter, the current control is continued by the abnormal-mode current control means replacing the normal-mode current control means, in the current control means 23, whereby the output of the motor torque from the motor can be continued, and the sense of unease felt by the driver can be relieved.

Moreover, in the abnormal-mode current control means, the current control suited to the abnormal state where any current does not flow through one phase of the motor or the inverter can be performed using the "three-phase individual control with an open phase assumed" in FIG. 3.

That is, as stated in Embodiment 1, the potential difference between the V-phase and W-phase can be fed with the required minimum voltages in case of, for example, the U-phase disconnection abnormality, and this is efficient.

Besides, with the "three-phase individual control with an open phase assumed", the shapes of the target currents of the respective phases and the shape of the motor torque as stated before can be designated by contriving and adjusting the shape of the unit target phase current. Therefore, the abnormal motor operation can be brought close to the operation of the motor in the normal mode in such a manner that the problem of the fall of the motor torque to zero as explained in the preceding sector can be solved, and the sense of unease felt by the driver can be relieved. More specifically, in the unit target phase current generation means 71, the unit target phase current is generated by employing the "drive scheme corresponding to a torque direction" shown in FIG. 5, whereby the acceleration of the rotation of the motor is enlarged immediately before the motor rotational angle at which the motor torque becomes zero is reached, and the motor can be rotated without stopping at the motor rotational angle at which the motor torque becomes zero. It is therefore possible to prevent the phenomenon that the assist force based on the motor is stopped, and to relieve the sense of unease felt by the driver.

Incidentally, the electric motor control apparatus 10 in Embodiment 8 as stated above has been the one indicated in Embodiment 1, but the electric motor control apparatus of Embodiment 3 may well be employed instead so as to employ the "inverse sinusoidal drive scheme" shown in FIG. 10, in the unit target phase current generation means 71.

Thus, the motor torque shape can be made trapezoidal as shown in FIG. 10(b), and the motor torque can make the amplitude of the torque ripple smaller as compared with the motor torque in the case of the ordinary dq control employing the sinusoidal drive shown in FIG. 7(b).

Besides, the electric motor control apparatus of Embodiment 4 may well be employed instead of the electric motor control apparatus of Embodiment 1, so as to employ the "drive scheme corresponding to a rotating direction" shown in FIG. 11, in the unit target phase current generation means 71.

Thus, in the case of the agreement between the directions of the motor torque and the motor rotational angular speed, immediately before the motor rotational angle at which the motor torque becomes zero is reached, the magnitude of the motor torque can be enlarged to accelerate the rotation of the motor. It is therefore possible to prevent the phenomenon that the assist force based on the motor is stopped, and to relieve the sense of unease felt by the driver.

Further, the electric motor control apparatus of Embodiment 5 may well be employed instead of the electric motor control apparatus of Embodiment 1, so as to employ the "drive scheme corresponding to an acceleration rotational direction" shown in FIG. 12, in the unit target phase current generation means 71.

Also in this case, in the case of the agreement between the directions of the motor torque and the motor rotational angular speed, immediately before the motor rotational angle at which the motor torque becomes zero is reached, the magnitude of the motor torque can be enlarged to accelerate the rotation of the motor. Further, when the magnitude of the acceleration is small, the magnitude of the motor torque can be enlarged to accelerate the rotation of the motor still more. It is accordingly possible to prevent the phenomenon that the assist force based on the motor is stopped, and to relieve the sense of unease felt by the driver.

In addition, the electric motor control apparatus of Embodiment 2 may well be employed instead of the electric motor control apparatus of Embodiment 1, so as to execute the abnormal-mode current control means 30d of the "three-phase individual control with an open phase assumed" in the abnormal-mode current control means, or the electric motor control apparatus of Embodiment 6 may well be employed so as to execute the abnormal-mode current control means 30b of the "dq control with an open phase assumed" in the abnormal-mode current control means.

Furthermore, the electric motor control apparatus of Embodiment 7 may well be employed instead of the electric motor control apparatus of Embodiment 1, so as to execute the abnormal-mode current control means 30c of the "voltage waveshaping dq control with an open phase assumed" in the abnormal-mode current control means.

In any case, the same advantages as those of the abnormal-mode current control means 30a of the "three-phase individual control with an open phase assumed" shown in FIG. 3 can be attained.

Embodiment 9

Embodiments 1-5 mentioned before have been described assuming that no error is involved between an actual motor rotational angle and a detected motor rotational angle. However, in a case where an error exists between the actual motor rotational angle and the detected motor rotational angle, a motor torque which is opposite in direction to a required motor torque might develop in the vicinity of a motor rotational angle at which a motor torque becomes zero, as shown in FIG. 18.

FIG. 18 corresponds to the case of the existence of the error that the detected angle has a smaller value than the actual angle. When current is caused to flow in accordance with the detected angle containing the error, it becomes a current which is not intended for the true motor rotational angle. The reason why the motor torque in the opposite direction develops, is that a current being opposite in direction to a current which ought to be caused to flow at the motor rotational angle (true value) is erroneously caused to flow on account of the motor rotational angle error, in the vicinity of the motor rotational angle where the motor torque becomes zero.

The phenomenon that a period for which the motor torque in the required direction cannot be generated continues, becomes liable to occur under the influence of the motor torque in the opposite direction.

Embodiment 9 of this invention solves such a problem.

FIG. 19 shows examples of waveforms which indicate the relations between unit target phase currents and the motor rotational angle (detected value), according to Embodiment 9 of this invention. FIG. 19(a) shows a case where a target q-axial current is plus, and FIG. 19(b) a case where the target q-axial current is minus.

That is, in Embodiment 9, a region where the value of the unit target phase current is made zero is set with a certain width in accordance with the direction of the target q-axial current, in the vicinity of the motor rotation detection angle at which the motor torque becomes zero, for example, in the vicinity of the motor rotation detection angle at which the value of the unit target phase current is made zero in the scheme shown in FIG. 5 as described in Embodiment 1.

According to Embodiment 9, even in the case where the error exists between the actual motor rotational angle and the detected motor rotational angle, the motor torque which is opposite in direction to the required motor torque is not generated in the vicinity of the motor rotational angle at which the motor torque becomes zero, and it is possible to prevent the phenomenon that the period for which the motor torque in the required direction cannot be generated continues.

Incidentally, in Embodiment 9, the region of zero is bestowed on the unit target phase current shown in FIG. 5 as described in Embodiment 1, but similar means can be applied to any aspect of Embodiments 1-5, and similar advantages can be attained.

Embodiment 10

FIG. 20 is a control block diagram of abnormal-mode current control means 30e according to Embodiment 10 of this invention.

The abnormal-mode current control means 30e in Embodiment 10 is such that the abnormal-mode current control means 30a shown in FIG. 3 as described in Embodiment 1, for example, is additionally provided with target dither current waveshaping means 200, and that a V-phase target dither current outputted by the target dither current waveshaping means 200 is added to a V-phase target current outputted by target current waveshaping means 50, by an adder 201, so as to set the added output signal as a V-phase target current anew.

The target dither current waveshaping means 200 generates an oscillatory signal in accordance with a target q-axial current and a motor rotational angle, and outputs the generated signal as the V-phase target dither current. The V-phase target dither current uses, for example, a sinusoidal wave, a triangular wave, a rectangular wave or the like, and the amplitude thereof is proportional to the target q-axial current, while the phase thereof depends upon the motor rotational angle.

According to the abnormal-mode current control means of Embodiment 10, minute oscillations can be superposed on a motor torque by the V-phase target dither current. Therefore, minute oscillations arise in a motor rotational angular speed, and motor rotation can be made difficult of stopping, so that the phenomenon of the continuation of a period for which the motor torque becomes zero can be prevented.

Incidentally, an example as stated below is also mentioned as the shape of another V-phase target dither current.

A sinusoidal signal whose amplitude is proportional to the target q-axial current and whose phase depends upon time, and the inverse sinusoidal signal shown in FIG. 10(a) are multiplied, and the resulting signal is used as the V-phase target dither current.

According to this V-phase target dither current, motor torque oscillations in a shape close to that of a sinusoidal wave whose amplitude is proportional to the q-axial target current and whose phase depends upon time can be superposed on the motor torque.

That is, when the signal obtained by multiplying the signal which is proportional to the motor torque oscillations (target dither torque) to be superposed and generated and the inverse sinusoidal signal which is shown in FIG. 10(a) is used as the V-phase target dither current, motor torque oscillations in a shape close to that of the desired motor torque oscillations (target dither torque) can be superposed on the motor torque.

Incidentally, although the above description of Embodiment 10 has mentioned the example in which the abnormal-mode current control means 30a shown in FIG. 3 as described in Embodiment 1 is additionally provided with the target dither current waveshaping means 200, similar advantages can be attained in such a way that the output signal of the target dither current waveshaping means 200 is similarly added to the output signal of the target phase current waveshaping means 50 in the abnormal-mode current control means shown in Embodiments 2 through 7.

Embodiment 11

FIG. 21 is a control block diagram of abnormal-mode current control means 30f according to Embodiment 11 of this invention.

The abnormal-mode current control means 30f of Embodiment 11 includes dq control means 100, target dither current waveshaping means 200, target voltage conversion means 210, and adders 220, 221 and 222. It is characterized in that a V-phase target dither current outputted by the target dither current waveshaping means 200 is converted into three-phase dither voltage commands by the target voltage conversion means 210, and that output signals which are obtained by adding three-phase voltage commands outputted by the dq control means 100, and the three-phase dither voltage commands outputted by the target voltage conversion means 210, by the adders 220, 221 and 222, are set as abnormal-mode three-phase voltage commands anew.

The target dither current waveshaping means 200 generates an oscillatory signal in accordance with a target q-axial current and a motor rotational angle, and outputs the generated signal as the V-phase target dither current.

The target voltage conversion means 210 converts the V-phase target dither current into the voltage values of three phases in accordance with, for example, the inverse model of a motor circuit equation in the case of a one-phase abnormality.

According to the abnormal-mode current control means of Embodiment 11, minute oscillations can be superposed on a motor torque. Therefore, minute oscillations arise in a motor rotational angular speed, and motor rotation can be made difficult of stopping, so that the phenomenon of the continuation of a period for which the motor torque becomes zero can be prevented.

Incidentally, one similar to the target dither current waveshaping means described in Embodiment 10 above can be used as the target dither current waveshaping means 200, and similar motor torque oscillations can be superposed.

Incidentally, in Embodiments 1-11 stated above, similar advantages are attained irrespective of whether the connection method of the motor is a star connection or a delta connection.

BRIEF DESCRIPTION OF THE DRAWINGS

[FIG. 6] It represents diagrams for comparing the phase voltages of a prior-art dq control and a control scheme in Embodiment 1 of this invention.

[FIG. 10] It is a diagram showing examples of a unit target phase current and a motor torque waveform according to Embodiment 3 of this invention.

[FIG. 18] It is an explanatory diagram for explaining the occurrence of an opposite-direction torque which is ascribable to the detection error of a motor rotational angle.

[FIG. 19] It is a diagram showing examples of waveforms which indicate the relations between unit target phase currents and the motor rotational angle (detected value), according to Embodiment 9 of this invention.

DESCRIPTION OF REFERENCE NUMERALS

Figure 1:
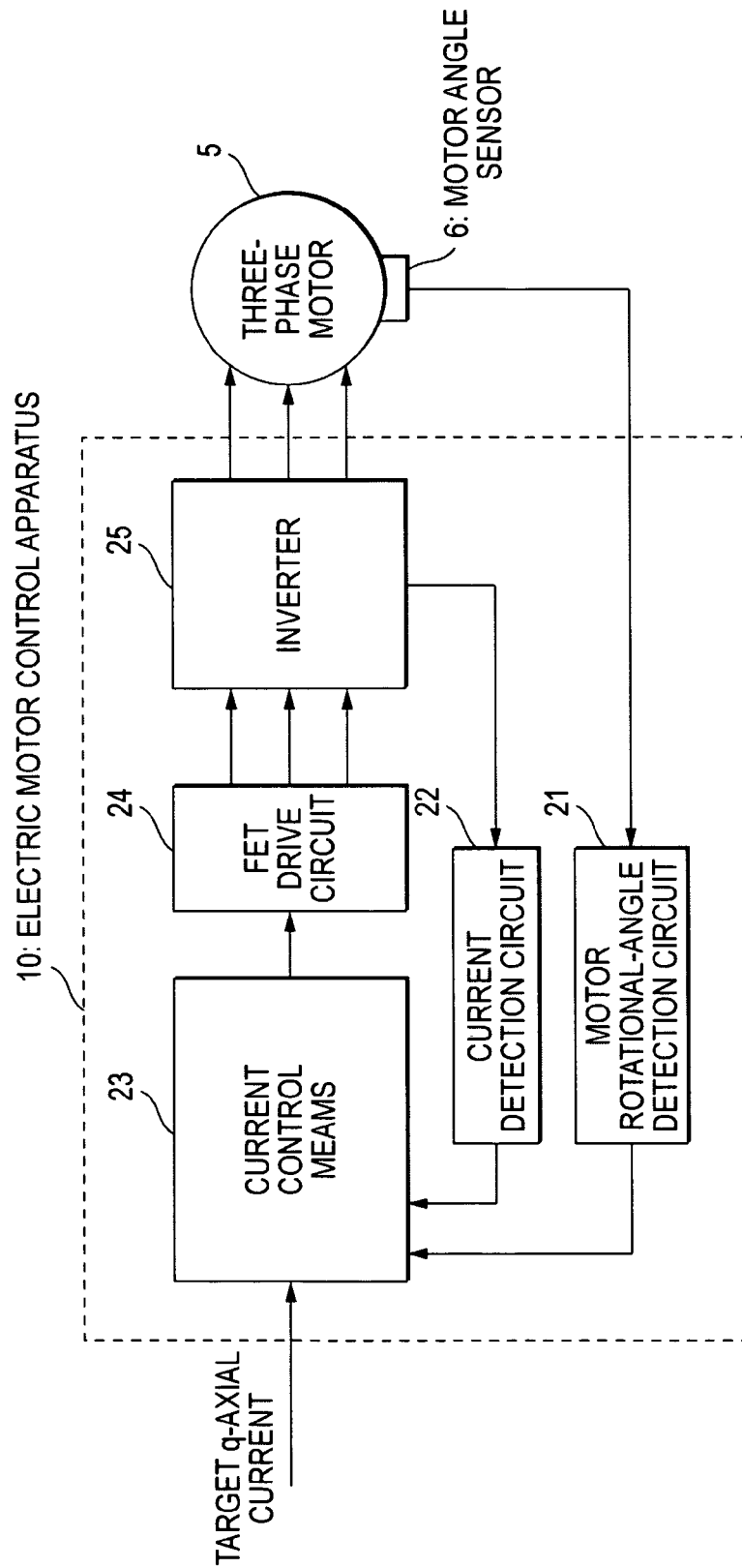
[FIG. 1] It is a schematic block diagram showing the general configuration of an electric motor control apparatus according to Embodiment 1 of this invention.
Figure 2:
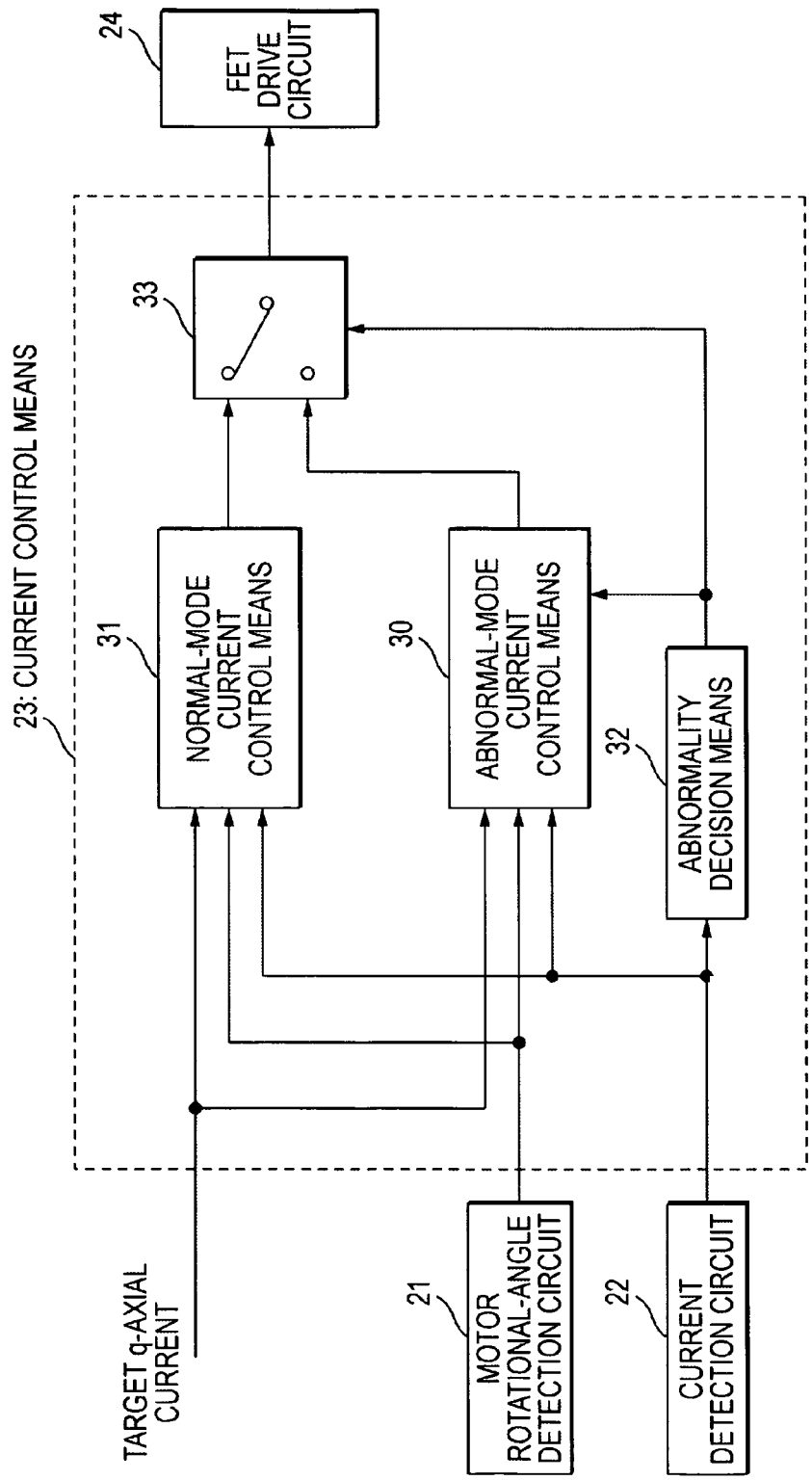
[FIG. 2] It is a block diagram showing the configuration of current control means in Embodiment 1 of this invention.
Figure 3:
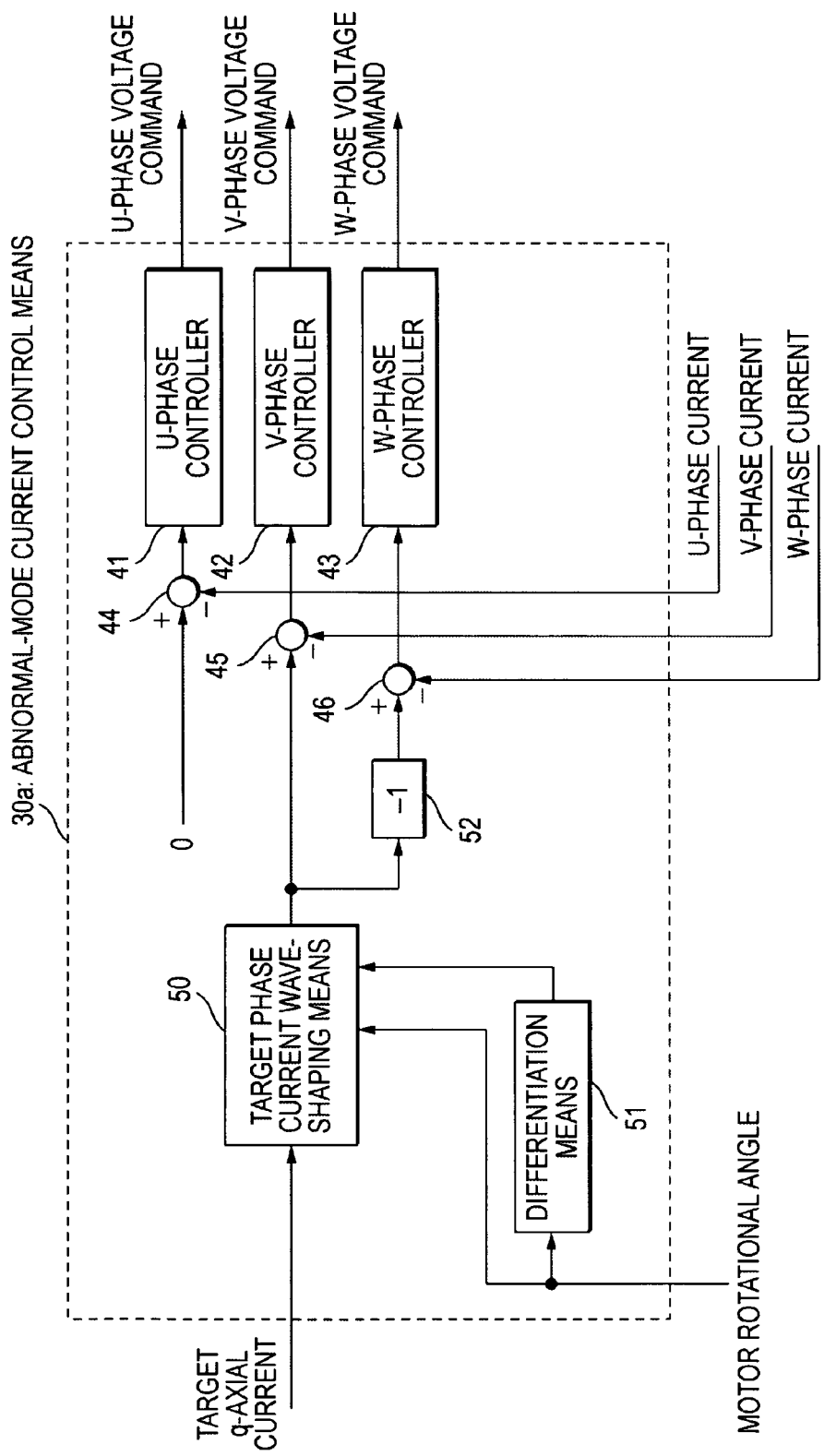
[FIG. 3] It is a control block diagram of abnormal-mode current control means in Embodiment 1 of this invention.
Figure 4:
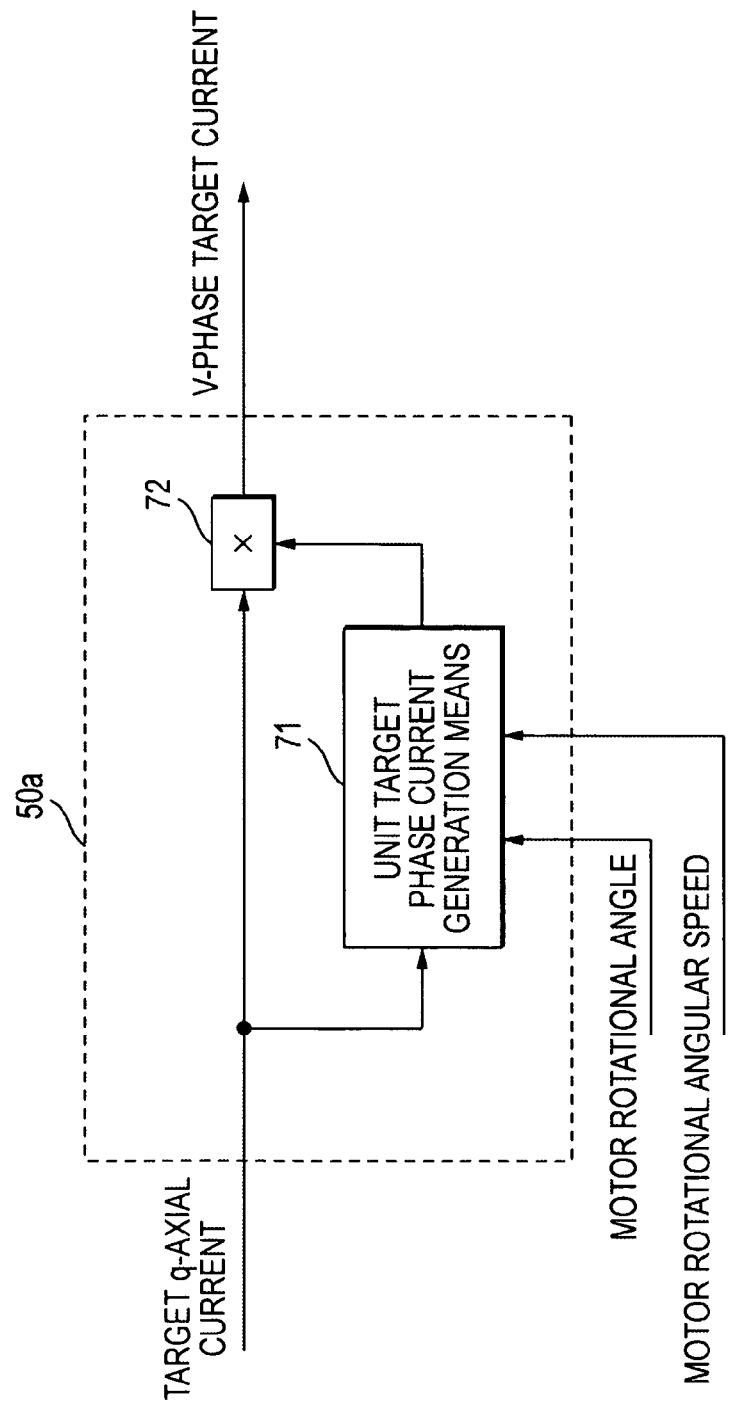
[FIG. 4] It is a block diagram showing an example of the configuration of target phase current waveshaping means in Embodiment 1 of this invention.
Figure 5:
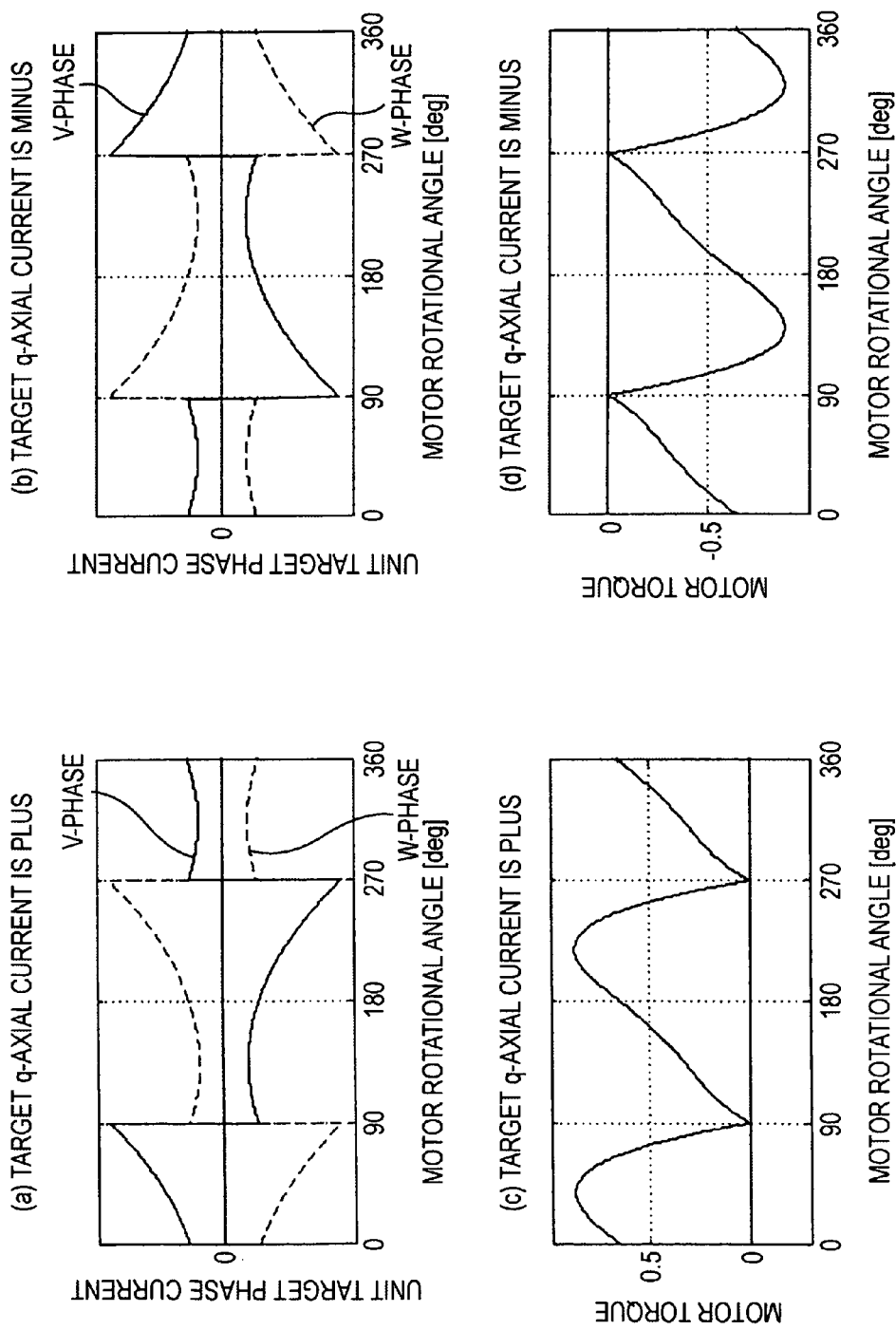
[FIG. 5] It represents graphs showing examples of a unit target phase current and a motor torque waveform in Embodiment 1 of this invention.
Figure 7:
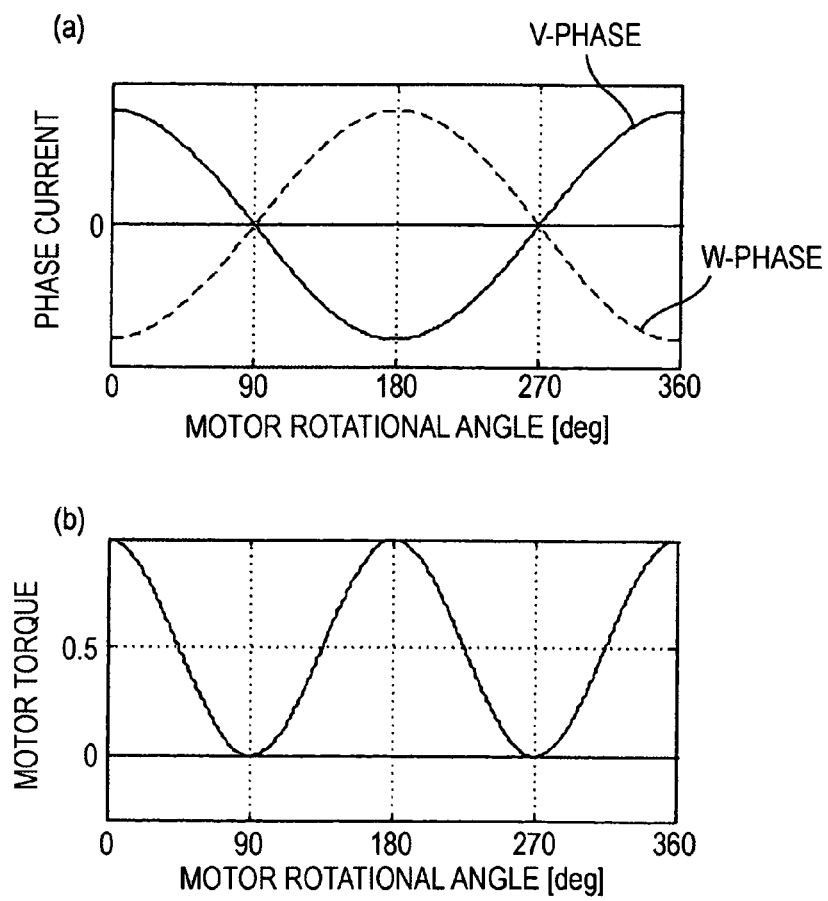
[FIG. 7] It represents waveform diagrams of phase currents and a motor torque in the case of a one-line disconnection abnormality in the ordinary dq control which employs sinusoidal drive.
Figure 8:
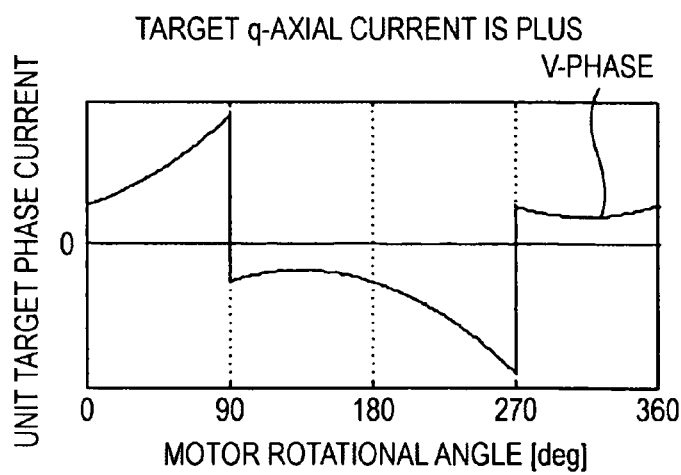
[FIG. 8] It is a diagram showing an example of the shape of a unit target phase current in Embodiment 1 of this invention.
Figure 9:
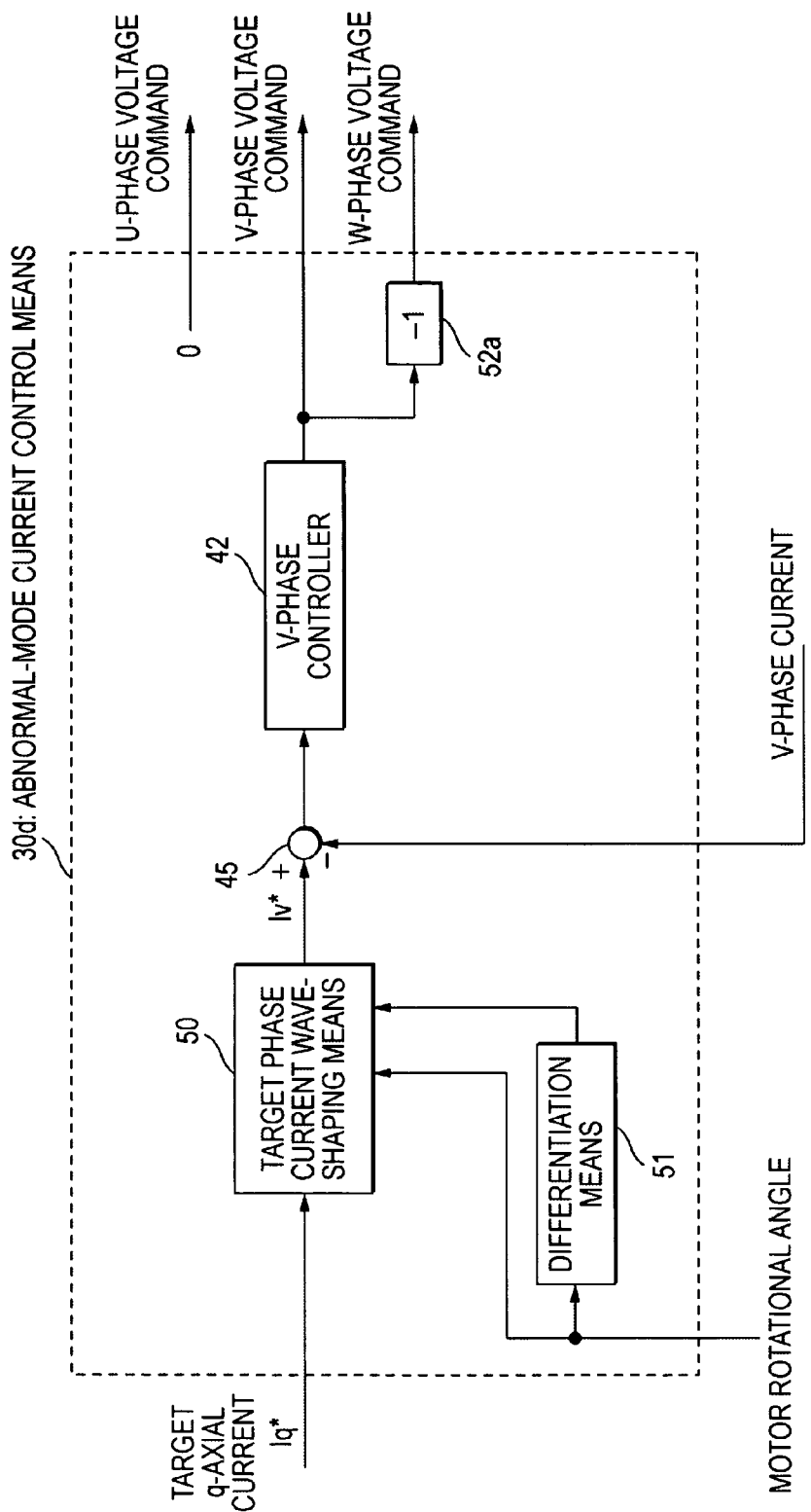
[FIG. 9] It is a control block diagram of abnormal-mode current means according to Embodiment 2 of this invention.
Figure 11:
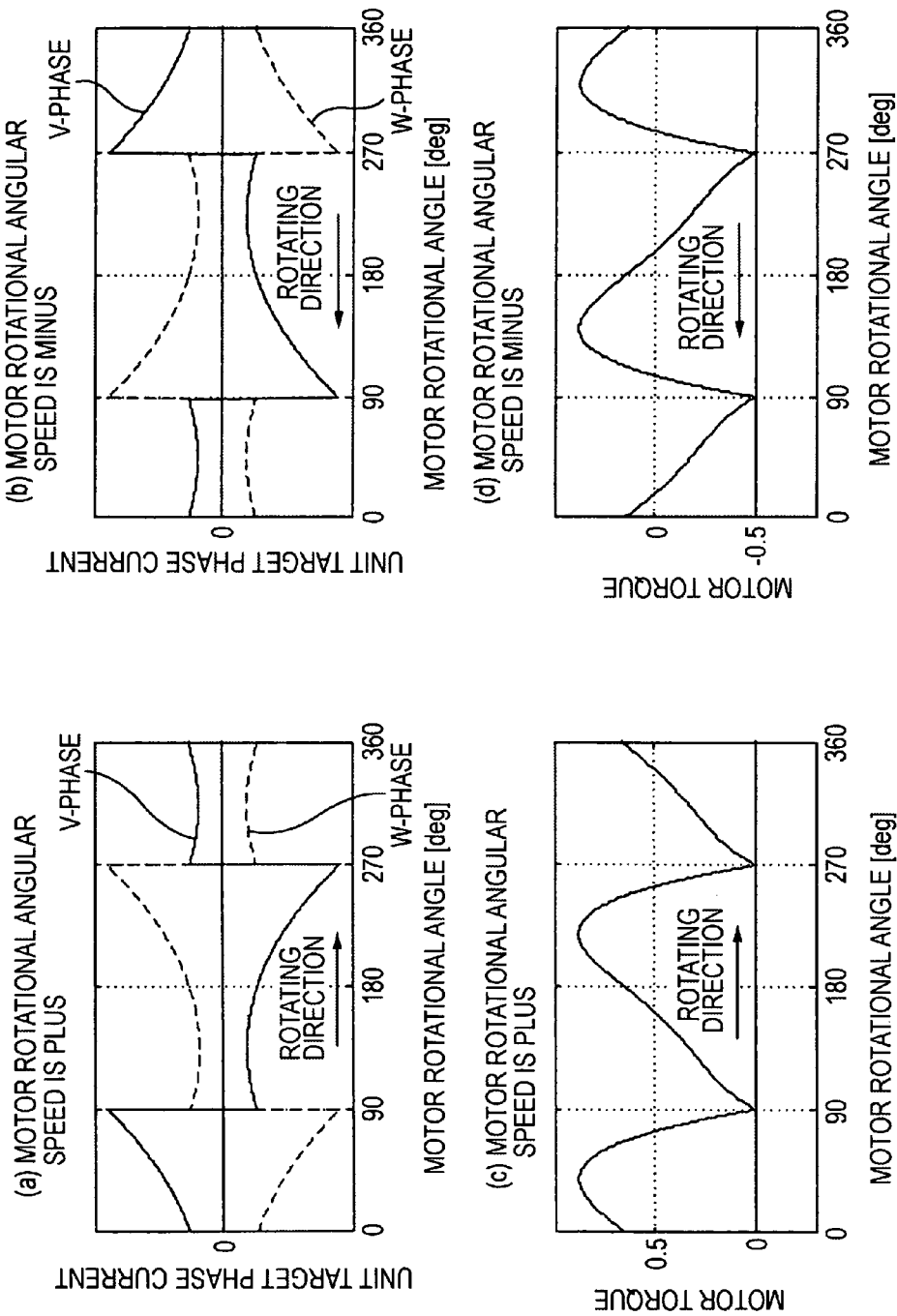
[FIG. 11] It is a diagram showing examples of a unit target phase current and a motor torque waveform according to Embodiment 4 of this invention.
Figure 12:
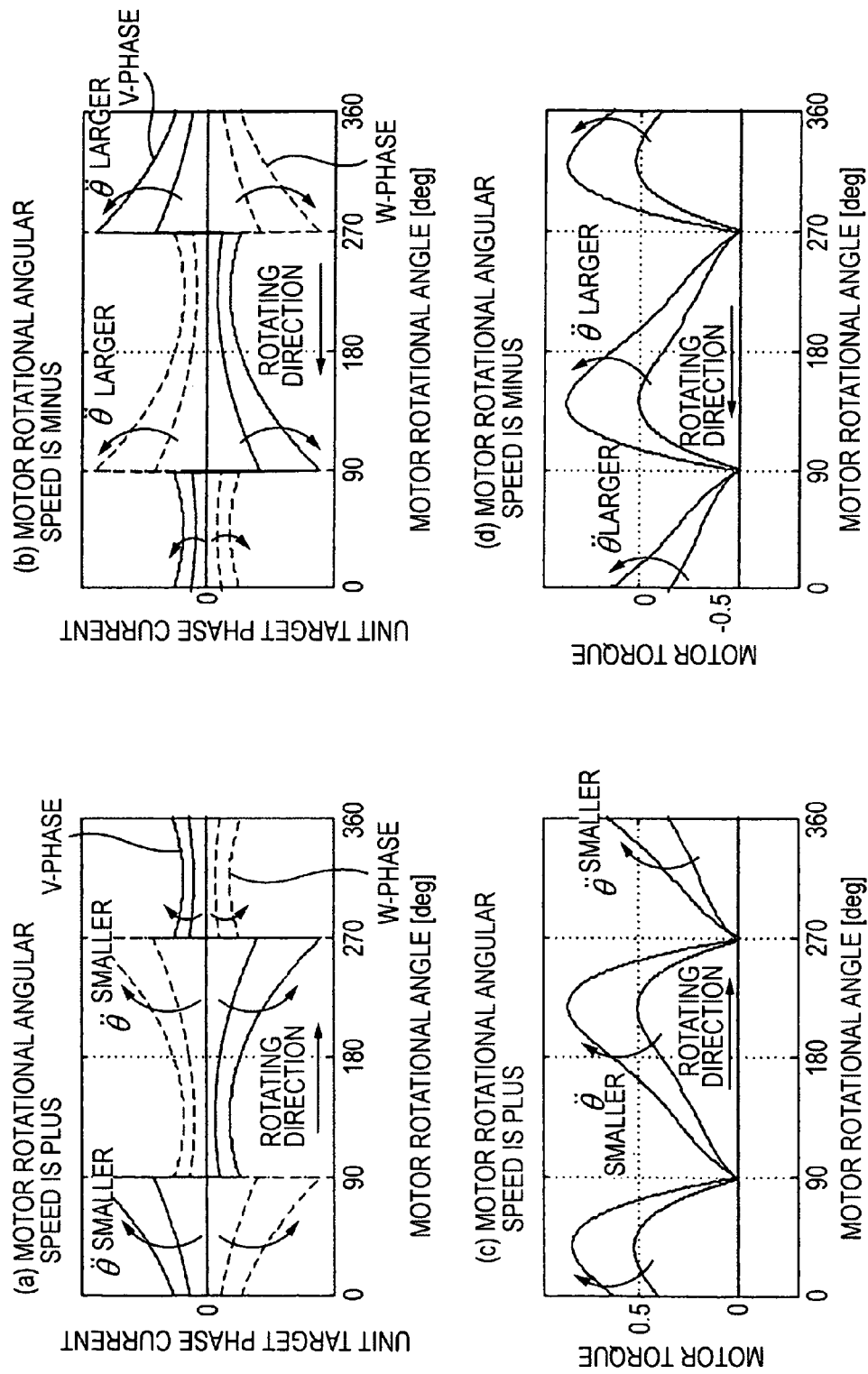
[FIG. 12] It is a diagram showing examples of a unit target phase current and a motor torque waveform according to Embodiment 5 of this invention.
Figure 13:
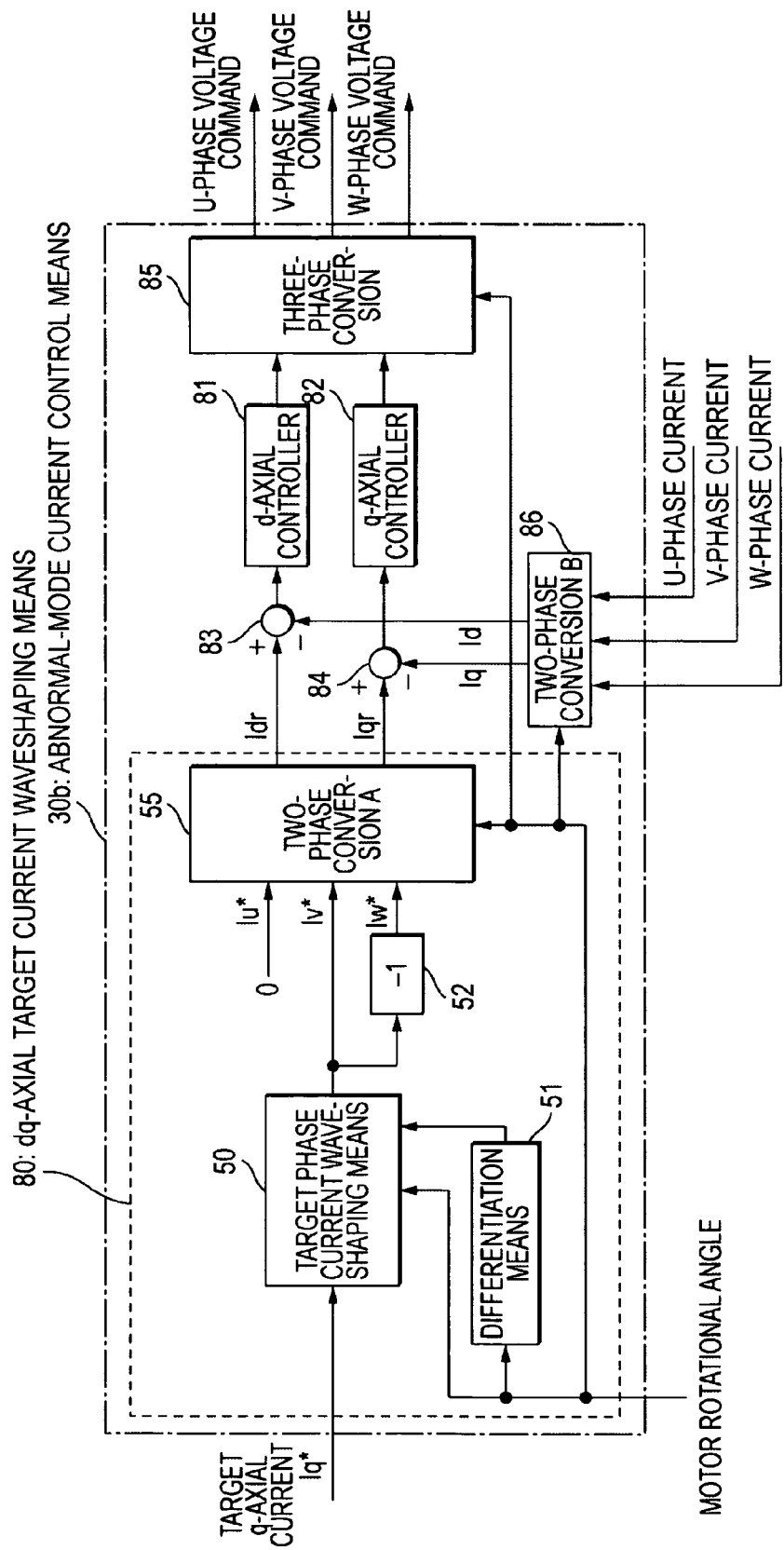
[FIG. 13] It is a control block diagram of abnormal-mode current control means according to Embodiment 6 of this invention.
Figure 14:
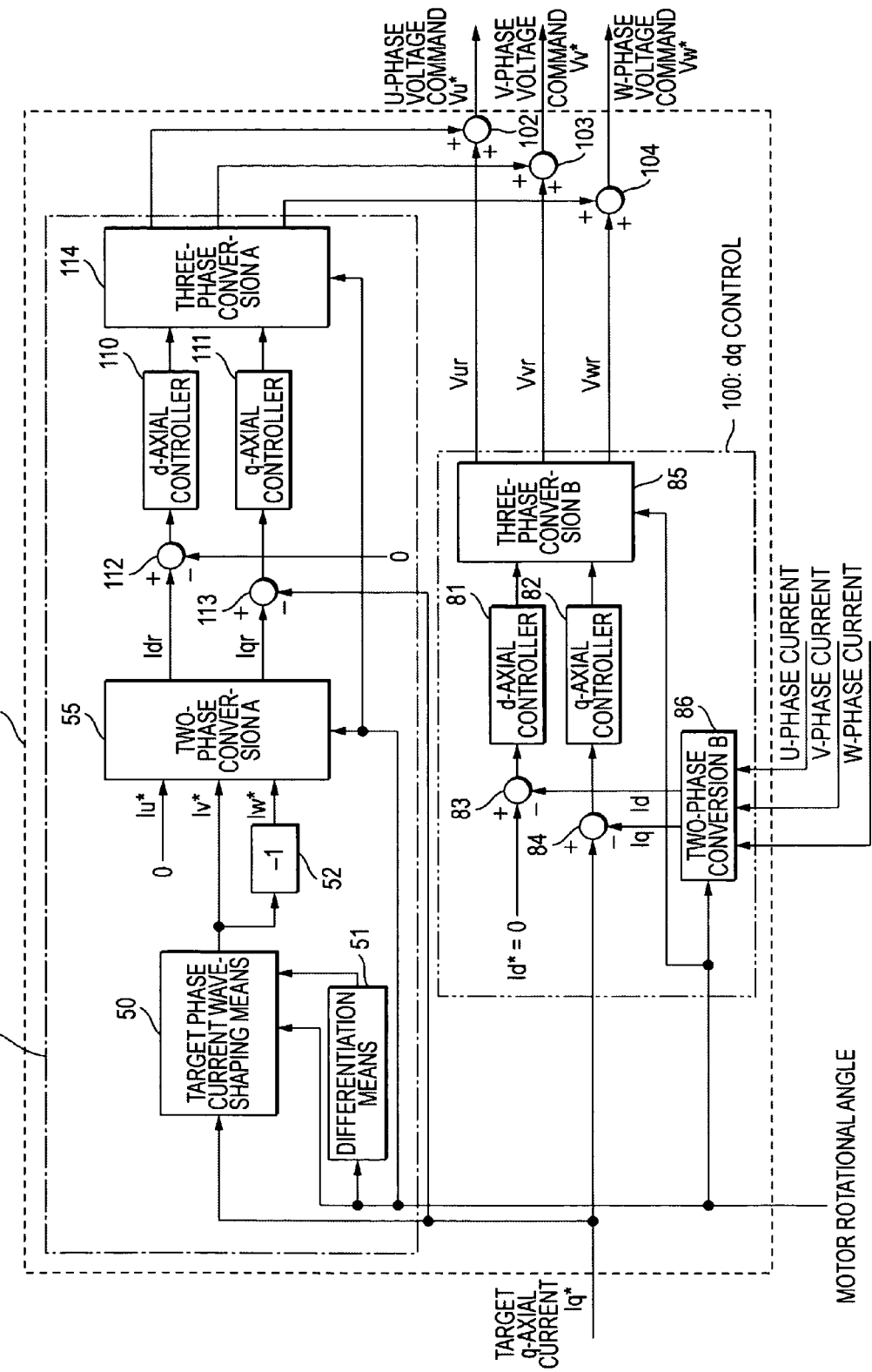
[FIG. 14] It is a control block diagram of abnormal-mode current control means according to Embodiment 7 of this invention.
Figure 15:
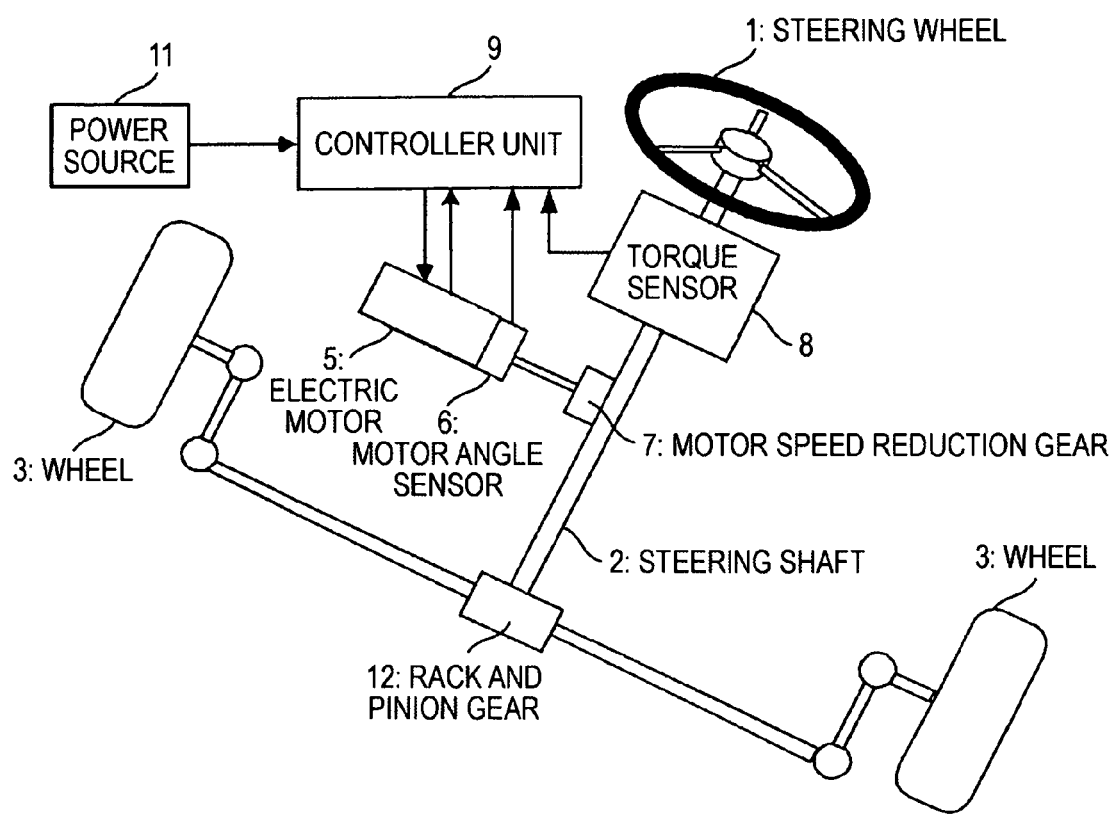
[FIG. 15] It is a schematic configurational view of an electrically-operated power steering apparatus according to Embodiment 8 of this invention.
Figure 16:
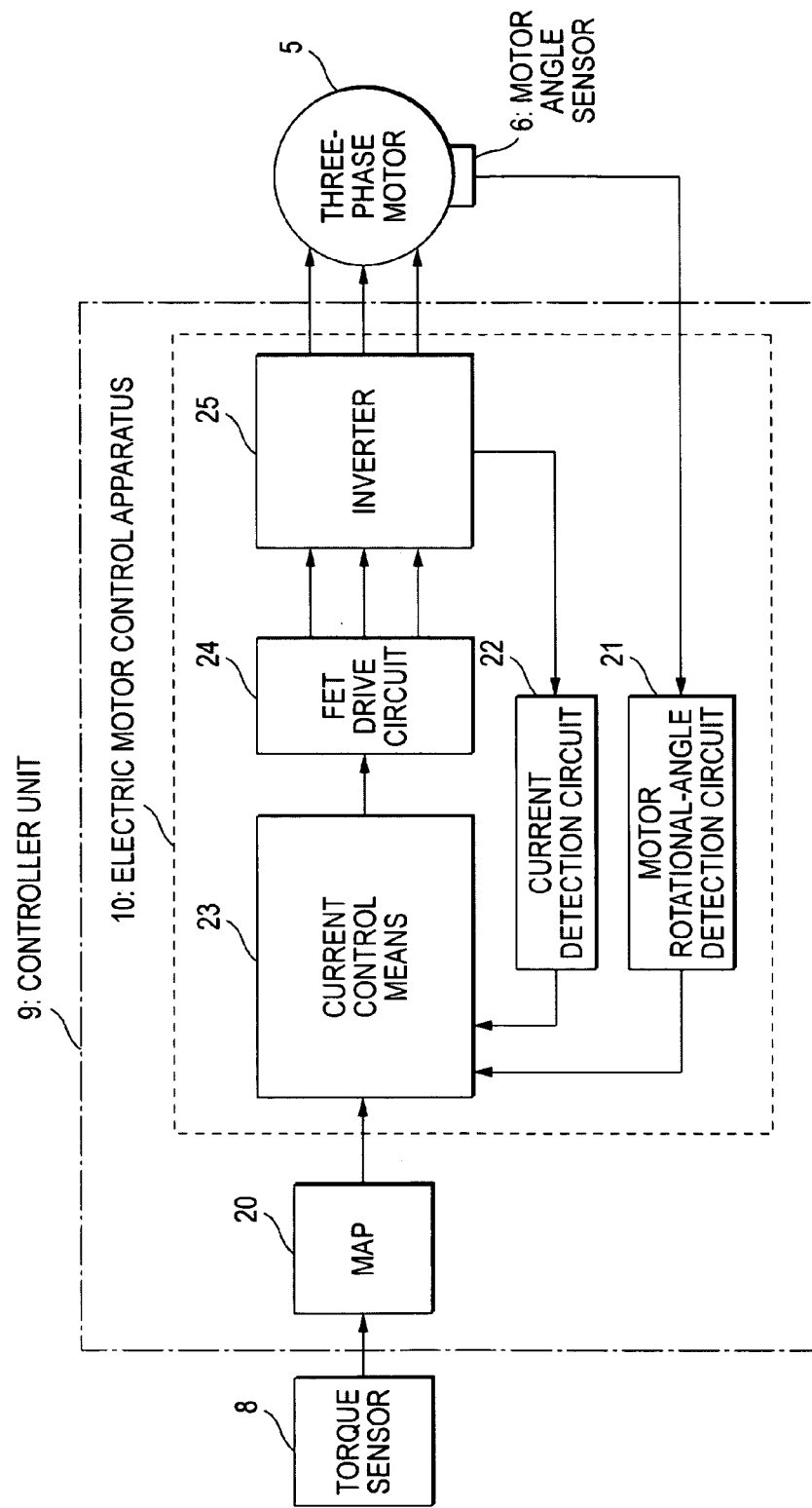
[FIG. 16] It is a block diagram showing the configuration of a controller unit in Embodiment 8 of this invention.
Figure 17:
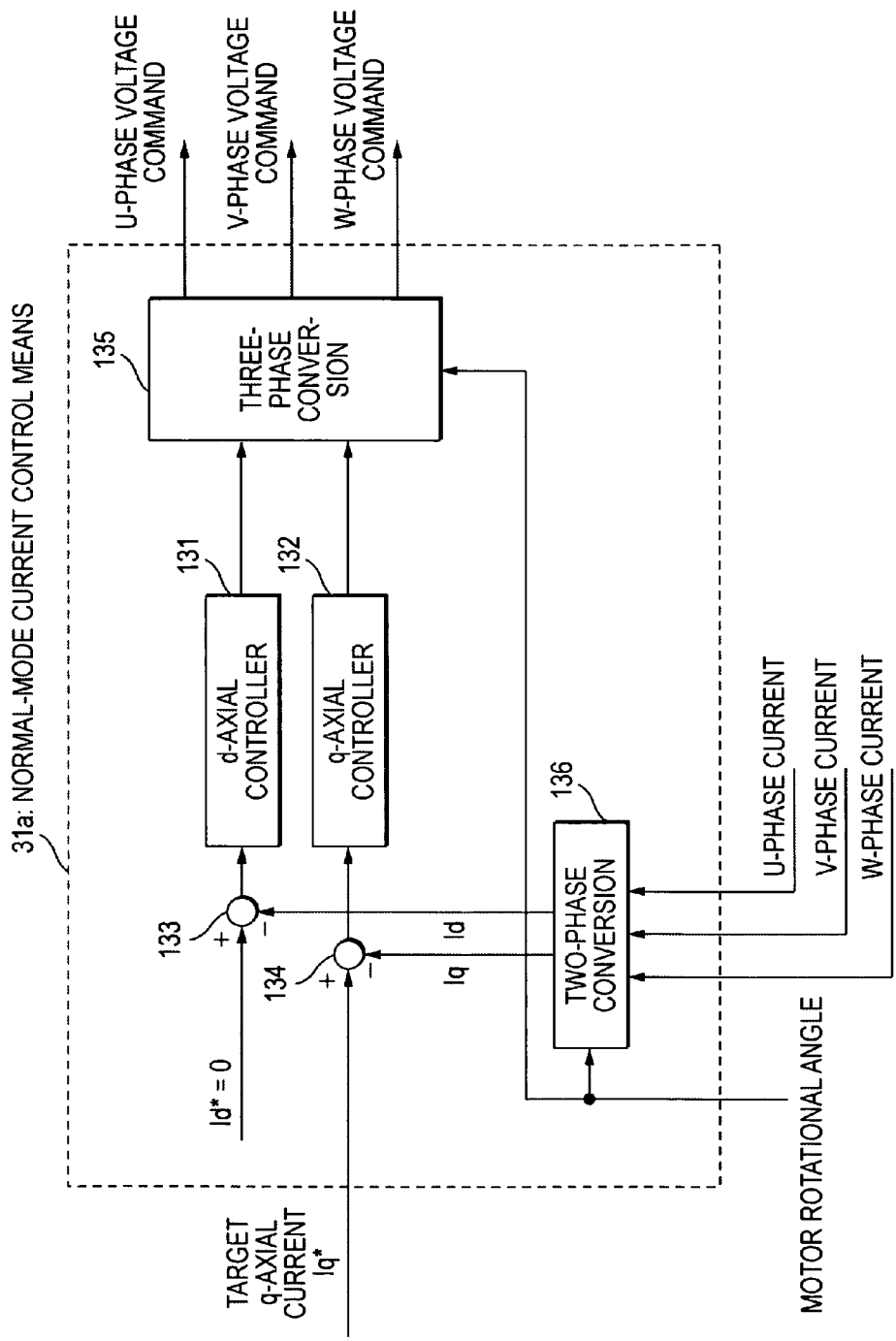
[FIG. 17] It is a control block diagram showing an example of normal-mode current control means for use in this invention.
Figure 20:
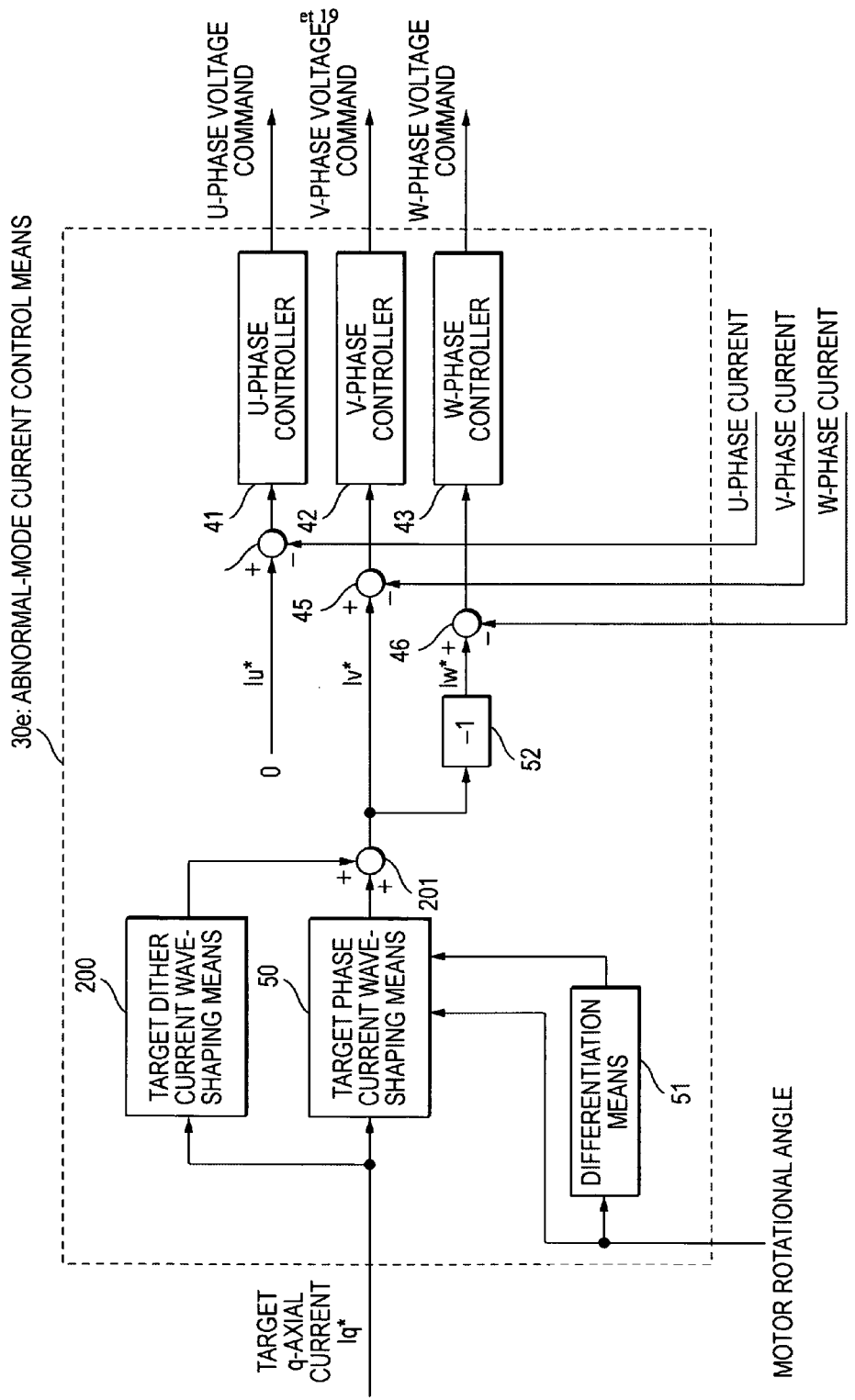
[FIG. 20] It is a control block diagram of abnormal-mode current control means according to Embodiment 10 of this invention.
Figure 21:
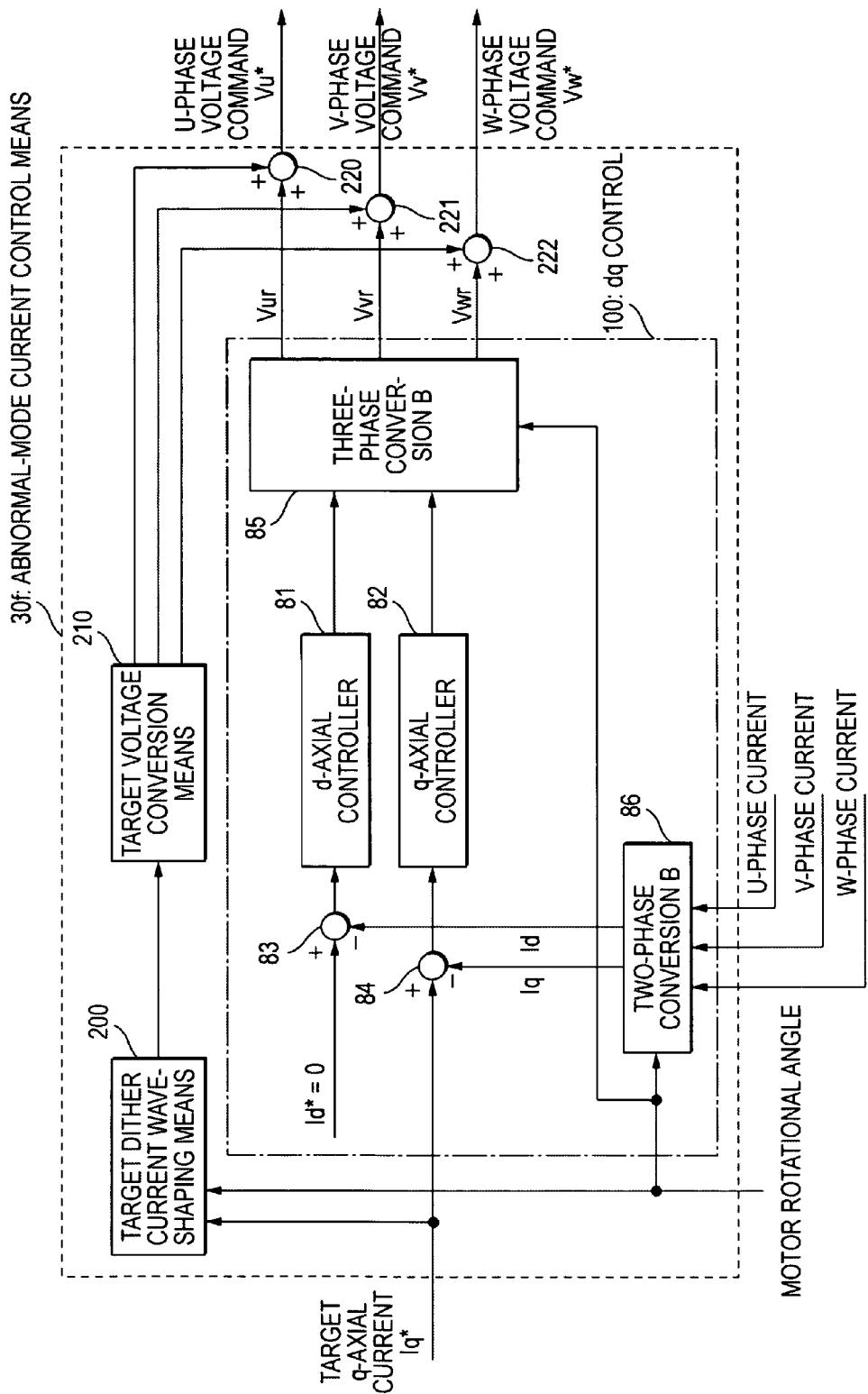
[FIG. 21] It is a control block diagram of abnormal-mode current control means according to Embodiment 11 of this invention.

5: motor, 10: electric motor control apparatus, 21: motor rotational-angle detection circuit, 22: current detection circuit, 23: current control means, 24: FET drive circuit, 25: inverter, 30: abnormal current control means, 31: normal-mode control means, 32: abnormality decision means, 33: changeover means.

The invention claimed is:

1. In an electric motor control apparatus for a multiphase AC electric motor, including motor rotational angle detection means for calculating a rotational angle of the electric motor, a current detection circuit which calculates currents flowing through respective phases of the electric motor, current control means for determining multiphase voltage commands in accordance with a target q-axial current corresponding to a target value of a torque to be generated by the electric motor, and the detection currents of respective phases and the motor rotational angle from the current detection circuit and the motor rotational angle detection means, a switching-element drive circuit which subjects the multiphase voltage commands from the current control means, to PWM modulation, and which gives commands of switching operations to an inverter, and the inverter which receives switching operation signals from the switching-element drive circuit, and which applies voltages to the respective phases of the electric motor and causes currents to flow therethrough;

an electric motor control apparatus wherein the current control means comprises normal-mode current control means for use in a normal mode, abnormal-mode current control means for use in an abnormal mode, abnormality decision means for detecting an abnormal state of the electric motor or the inverter, and changeover means for selecting either the normal-mode current control means or the abnormal-mode current control means on the basis of a command from the abnormality decision means, wherein in case of occurring abnormality to one phase of the electric motor or the inverter, the abnormal-mode current control means is selected by the changeover means, and abnormal-mode multiphase voltage commands generated by the abnormal-mode current control means are set as the multiphase voltage commands for the switching-element drive circuit.

2. An electric motor control apparatus as claimed in claim 1, wherein the abnormal-mode current control means generates the voltage commands of the respective phases so as to satisfy a balanced condition in which a sum of the voltage commands of the normal phases except the phase undergoing the abnormality becomes zero, thereby to output the generated voltage commands as the abnormal-mode multiphase voltage commands.

3. An electric motor control apparatus as claimed in claim 1, wherein the abnormal-mode current control means includes:

target phase current waveshaping means for calculating target currents of the respective phases in accordance with the target q-axial current corresponding to the target value of the motor torque, and the motor rotational angle, so as to satisfy a balanced condition in which a sum of the target currents of the normal phases except the phase undergoing the abnormality becomes zero, and for outputting the calculated target currents as multiphase target currents; and controllers which generate the abnormal-mode multiphase voltage commands on the basis of the target currents of the normal phases, and the detection currents of the respective phases from the current detection circuit;

wherein the target currents of the respective phases are individually designated by the target phase current waveshaping means, thereby to individually control currents of the respective phases of the electric motor.

4. An electric motor control apparatus as claimed in claim 1, wherein the abnormal-mode current control means includes target phase current waveshaping means for generating a target current of a first phase in accordance with the target q-axial current corresponding to the target value of the motor torque, and the motor rotational angle, one controller which outputs a voltage command of the first phase on the basis of the target current of the first phase and the detection current from the current detection circuit, and conversion means for converting the voltage command of the first phase from the controller, into a voltage command opposite in sign and equal in absolute value, so as to output the resulting voltage command as a voltage command of a second phase, wherein the voltage command of the first phase and the voltage command of the second phase are outputted as the multiphase voltage commands, thereby to control the three-phase AC electric motor.

5. An electric motor control apparatus as claimed in claim 1, wherein the abnormal-mode current control means includes:

target phase current waveshaping means for calculating target currents of the respective phases in accordance with the target q-axial current corresponding to the target value of the motor torque, and the motor rotational angle, so as to satisfy a balanced condition in which a sum of the target currents of the normal phases except the phase undergoing the abnormality becomes zero, and for outputting the calculated target currents as multiphase target currents;

two-phase conversion means for subjecting the multiphase target currents to two-phase conversion on the basis of the motor rotational angle, thereby to generate a waveshaped d-axial target current and a waveshaped q-axial target current; and dq control means for executing a dq control on the basis of the waveshaped d-axial target current and the waveshaped q-axial target current from the two-phase conversion means, the detection currents of the respective phases from the current detection circuit, and the motor rotational angle and generating the multiphase voltage commands;

wherein the target currents of the respective phases are individually designated by the target phase current waveshaping means, so as to execute the dq control in which the waveshaped d-axial target current and the waveshaped q-axial target current are target signals of a d-axial current and a q-axial current, with the dq control means.

6. An electric motor control apparatus as claimed in claim 1, wherein the abnormal-mode current control means includes:

dq control means for executing a dq control on the basis of the target q-axial current corresponding to the target value of the motor torque, the detection currents of the respective phases from the current detection circuit, and the motor rotational angle, and for generating voltage commands of the respective phases;

target phase current waveshaping means for calculating target currents of the respective phases in accordance with the target q-axial current corresponding to the target value of the motor torque, and the motor rotational angle, so as to satisfy a balanced condition in which a sum of the target currents of the normal phases except the phase undergoing the abnormality becomes zero, and for outputting the calculated target currents as multiphase target currents; and voltage waveshaping means including two-phase conversion means for subjecting the multiphase target currents to two-phase conversion on the basis of the motor rotational angle, thereby to generate a waveshaped d-axial target current and a waveshaped q-axial target current, and means for subtracting a target d-axial current and the target q-axial current from the waveshaped d-axial target current and the waveshaped q-axial target current, for generating a d-axial voltage command and a q-axial voltage command from the subtraction values, and for generating voltage waveshaping signals of the respective phases on the basis of the d-axial voltage command, the q-axial voltage command and the motor rotational angle;

wherein the multiphase voltage commands are outputted by adding the voltage commands of the respective phases from the dq control means and the voltage waveshaping signals of the respective phases from the voltage waveshaping means.

7. An electric motor control apparatus as claimed in claim 1, wherein the abnormal-mode current control means includes:

target phase current waveshaping means which calculates target currents of the respective phases in accordance with the target q-axial current corresponding to the target value of the motor torque, and the motor rotational angle, and which corrects the calculated target currents depending upon a direction of the target q-axial current, and outputs the corrected target currents as multiphase target currents;

wherein the abnormal-mode current control means generates the abnormal-mode multiphase voltage commands on the basis of the multiphase target currents, and the detection currents of the respective phases from the current detection circuit.

8. An electric motor control apparatus as claimed in claim 1, wherein the abnormal-mode current control means includes:

target phase current waveshaping means which calculates target currents of the respective phases in accordance with the target q-axial current corresponding to the target value of the motor torque, and an inverse number of a cosine concerning the motor rotational angle, and which outputs the calculated target currents as multiphase target currents;

wherein the abnormal-mode current control means generates the abnormal-mode multiphase voltage commands on the basis of the multiphase target currents, and the detection currents of the respective phases from the current detection circuit.

9. An electric motor control apparatus as claimed in claim 1, wherein the abnormal-mode current control means includes:

target phase current waveshaping means which calculates target currents of the respective phases in accordance with the target q-axial current corresponding to the target value of the motor torque, the motor rotational angle and a motor rotational angular speed, and which outputs the calculated target currents as multiphase target currents;

wherein the abnormal-mode current control means generates the abnormal-mode multiphase voltage commands on the basis of the multiphase target currents, and the detection currents of the respective phases from the current detection circuit.

10. An electric motor control apparatus as claimed in claim 1, wherein the abnormal-mode current control means includes:

target phase current wave shaping means which calculates target currents of the respective phases in accordance with the target q-axial current corresponding to the target value of the motor torque, the motor rotational angle, a motor rotational angular speed, and a motor rotational angular acceleration, and which outputs the calculated target currents as multiphase target currents;

wherein the abnormal-mode current control means generates the abnormal-mode multiphase voltage commands on the basis of the multiphase target currents, and the detection currents of the respective phases from the current detection circuit.

11. An electric motor control apparatus as claimed in claim 1, further comprising motor torque detection means for calculating a torque which is to be generated by the electric motor, on the basis of the detection currents of the respective phases of the electric motor and the motor rotational angle, and for generating a motor torque signal;

wherein the abnormal-mode current control means includes target phase current waveshaping means which calculates target currents of the respective phases in accordance with the target q-axial current corresponding to the target value of the motor torque, and the motor rotational angle, and which corrects the calculated target currents by the motor torque signal, and outputs the corrected target currents as multiphase target currents, and the abnormal-mode current control means generates the abnormal-mode multiphase voltage, commands on the basis of the multiphase target currents, and the detection currents of the respective phases from the current detection circuit.

12. An electric motor control apparatus as claimed in claim 1, wherein the abnormal-mode current control means includes:

target phase current waveshaping means which calculates target currents of the respective phases in accordance with the target q-axial current corresponding to the target value of the motor torque, and the motor rotational angle, and which outputs the calculated target currents as multiphase target currents which have regions where the multiphase target currents are set at zero, in the vicinity of a motor rotational angle at which plus and minus signs of the multiphase target currents change;

wherein the abnormal-mode current control means generates the abnormal-mode multiphase voltage commands on the basis of the multiphase target currents, and the detection currents of the respective phases from the current detection circuit.

13. An electric motor control apparatus as claimed in claim 1, wherein the abnormal-mode current control means includes:

target phase current waveshaping means which calculates target currents of the respective phases in accordance with the target q-axial current corresponding to the target value of the motor torque, and the motor rotational angle, and which outputs the calculated target currents as multiphase target currents;

target dither current waveshaping means which generates an oscillatory signal in accordance with the target q-axial current corresponding to the target value of the motor torque, and the motor rotational angle, and which outputs the generated signal as a target dither current;

wherein the target dither current is superposed on the multiphase target currents outputted by the target phase current waveshaping means, so as to set new multiphase target currents, and the abnormal-mode current control means generates the abnormal-mode multiphase voltage commands on the basis of the new multiphase target currents, and the detection currents of the respective phases from the current detection circuit.

14. An electric motor control apparatus as claimed in claim 1, wherein the abnormal-mode current control means includes dq control means for executing a dq control on the basis of the target q-axial current corresponding to the target value of the motor torque, the detection currents of the respective phases from the current detection circuit, and the motor rotational angle, and for generating voltage commands of the respective phases, target dither current waveshaping means for generating an oscillatory signal in accordance with the target q-axial current and the motor rotational angle, and for outputting a target dither current of each phase, and target voltage conversion means for converting the target dither current into three-phase dither voltage commands, wherein the voltage commands of the respective phases outputted by the dq control means and the three-phase dither voltage commands outputted by the target voltage conversion means are added, so as to output the added voltage commands as the multiphase voltage commands.

* * * * *